United States Patent
Li et al.

(10) Patent No.: US 8,315,589 B2
(45) Date of Patent: Nov. 20, 2012

(54) EMERGENCY CALLS FOR INTERNET PROTOCOL MULTIMEDIA SUBSYSTEM (IMS) OVER PACKET SWITCHED CODE DIVISION MULTIPLE ACCESS (CDMA) NETWORKS

(75) Inventors: Mingxing S Li, San Jose, CA (US); Phillip A Ritter, Danville, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 451 days.

(21) Appl. No.: 12/571,063

(22) Filed: Sep. 30, 2009

(65) Prior Publication Data

US 2011/0076982 A1 Mar. 31, 2011

(51) Int. Cl.
*H04M 11/04* (2006.01)
*H04M 1/725* (2006.01)
*H04M 1/663* (2006.01)
*H04M 1/00* (2006.01)
*H04W 40/00* (2009.01)

(52) U.S. Cl. .............. 455/404.1; 455/412.2; 455/445; 455/552.1

(58) Field of Classification Search .............. 455/404.1, 455/552.1, 412.2, 445
See application file for complete search history.

(56) References Cited

U.S. PATENT DOCUMENTS

| | | | | |
|---|---|---|---|---|
| 6,636,732 B1 * | 10/2003 | Boling et al. | .............. | 455/404.1 |
| 6,801,762 B1 * | 10/2004 | Huilgol | .............. | 455/404.1 |
| 6,957,068 B2 * | 10/2005 | Hutchison et al. | .............. | 455/435.2 |
| 2005/0232186 A1 * | 10/2005 | Karaoguz et al. | .............. | 370/328 |
| 2010/0329433 A1 * | 12/2010 | Bushnell | .............. | 379/45 |

OTHER PUBLICATIONS

Blackberry Curve 8330 Smartphone User Guide, 2007, Research in Motion, p. 23 (available online at http://docs.blackberry.com/en/smartphone_users/deliverables/1202/userguide_bb8330_cdma.pdf.*

3GPP TS 23.167; 3$^{rd}$ Generation Partnership Project; Technical Specification Group Services and System Aspects; IP Multimedia Subsystem (IMS) Emergency Sessions (Release 8), V8.3.0, (Mar. 2009), 36 pages.

3GPP TS 23.203; 3$^{rd}$ Generation Partnership Project; Technical Specification Group Services and System Aspects; Policy and Charging Control Architecture (Release 8), V8.5.0 (Mar. 2009), 113 pages.

3GPP2 S.R0115-0; 3$^{rd}$ Generation Partnership Project 2 "3GPP2"; All-IP Network Emergency Call Support, Stage 1 Requirements, Version 2.0, (Oct. 2007), 9 pages.

3GPP2 X.50060-0; 3$^{rd}$ Generation Partnership Project 2 "3GPP2"; HRPD Support for Emergency Services, Version 1.0, (Jul. 2008), 18 pages.

3GPP2 X.50049-0; 3$^{rd}$ Generation Partnership Project 2 "3GPP2"; All-IP Network Emergency Call Support, Version 1.0, Feb. 18, 2008, 68 pages.

3GPP TS 23.003; 3$^{rd}$ Generation Partnership Project; Technical Specification Group Core Network and Terminals; Numbering, Addressing and Identification (Release 8), V8.4.0, (Mar. 2009), 71 pages.

(Continued)

*Primary Examiner* — Dwayne Bost
*Assistant Examiner* — Larry Sternbane

(57) ABSTRACT

A mobile communication device receives initiation of an emergency call by a user of the mobile communication device, and determines whether a single-carrier radio transmission technology (1xRTT) network is available for the emergency call. The mobile communication device also routes the emergency call over the 1xRTT network when the 1xRTT network is available for the emergency call, and routes the emergency call over an enhanced high rate packet data (eHRPD) network when the 1xRTT network is unavailable for the emergency call.

25 Claims, 26 Drawing Sheets

OTHER PUBLICATIONS

3GPP TS 22.101; 3$^{rd}$ Generation Partnership Project; Technical Specification Group Services and System Aspects Service Aspects; Service Principles (Release 9), V9.3.0, (Mar. 2009), 57 pages.

3GPP TS 23.228; 3$^{rd}$ Generation Partnership Project; Technical Specification Group Services and System Aspects; IP Multimedia Subsystem (IMS); Stage 2 (Release 8), V8.8.0, (Mar. 2009), 248 pages.

3GPP TS 24.229; 3$^{rd}$ Generation Partnership Project; Technical Specification Group Core Network and Terminals; IP Multimedia Call Control Protocol Based on Session Intiation Protocol (SIP) and Session Description Protocol (SDP); Stage 3 (Release 8), V8.7.0, (Mar. 2009), 618 pages.

National Emergency Number Association (NENA), "Interim VoIP Architecture for Enhanced 9-1-1 Services (i2)", Issue 1 Dec. 6, 2005, 181 pages.

IMT—2000 3GPP2—All-IP Core Network Multimedia Domain—IP Multimedia (IMS) Session Handling; IP Multimedia (IM) Call Model—Stage 2, Telecommunications Technology Association, TTAT.3G-X.50013-004-A v1.0, Apr. 19, 2006, 304 pages.

* cited by examiner

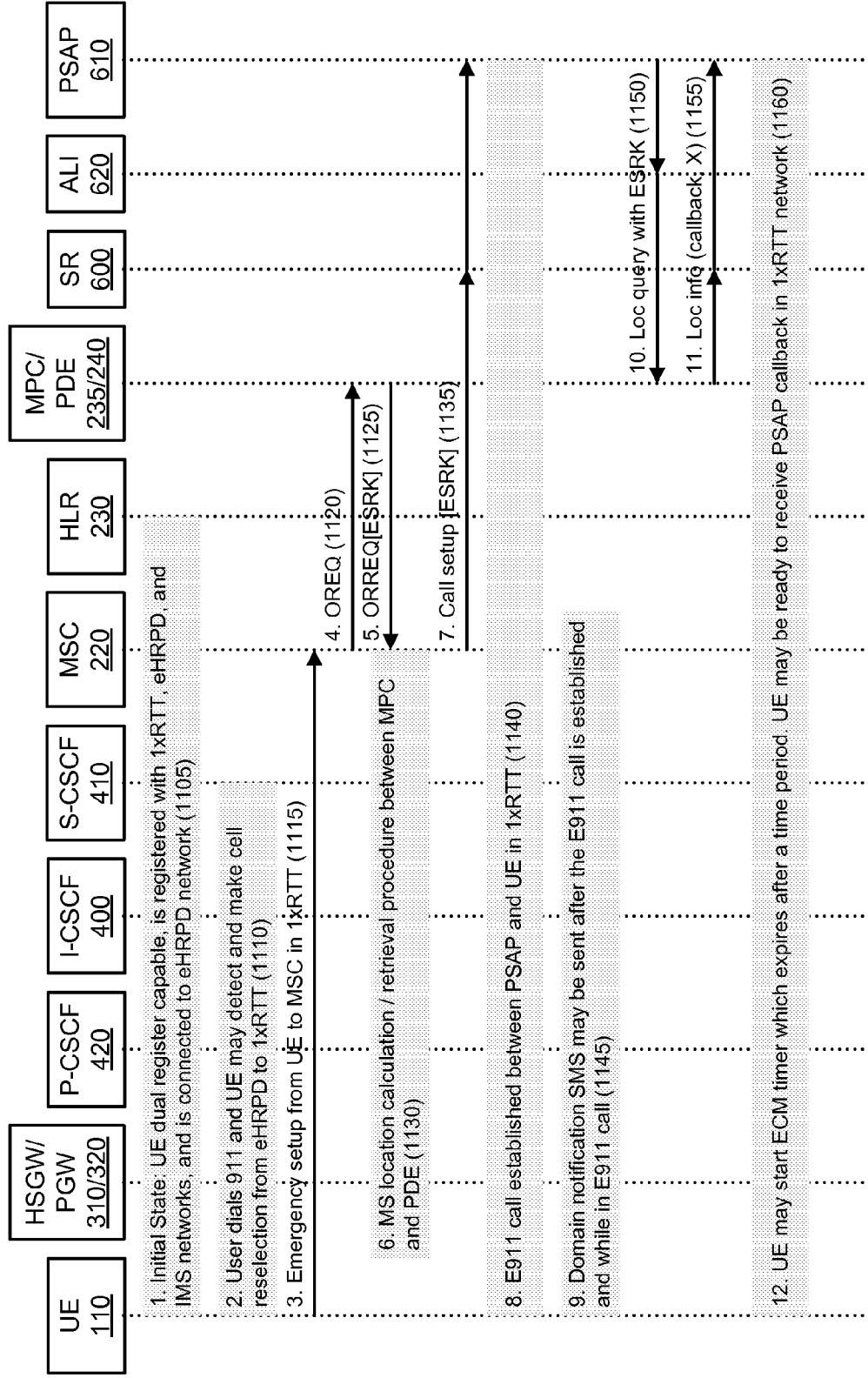

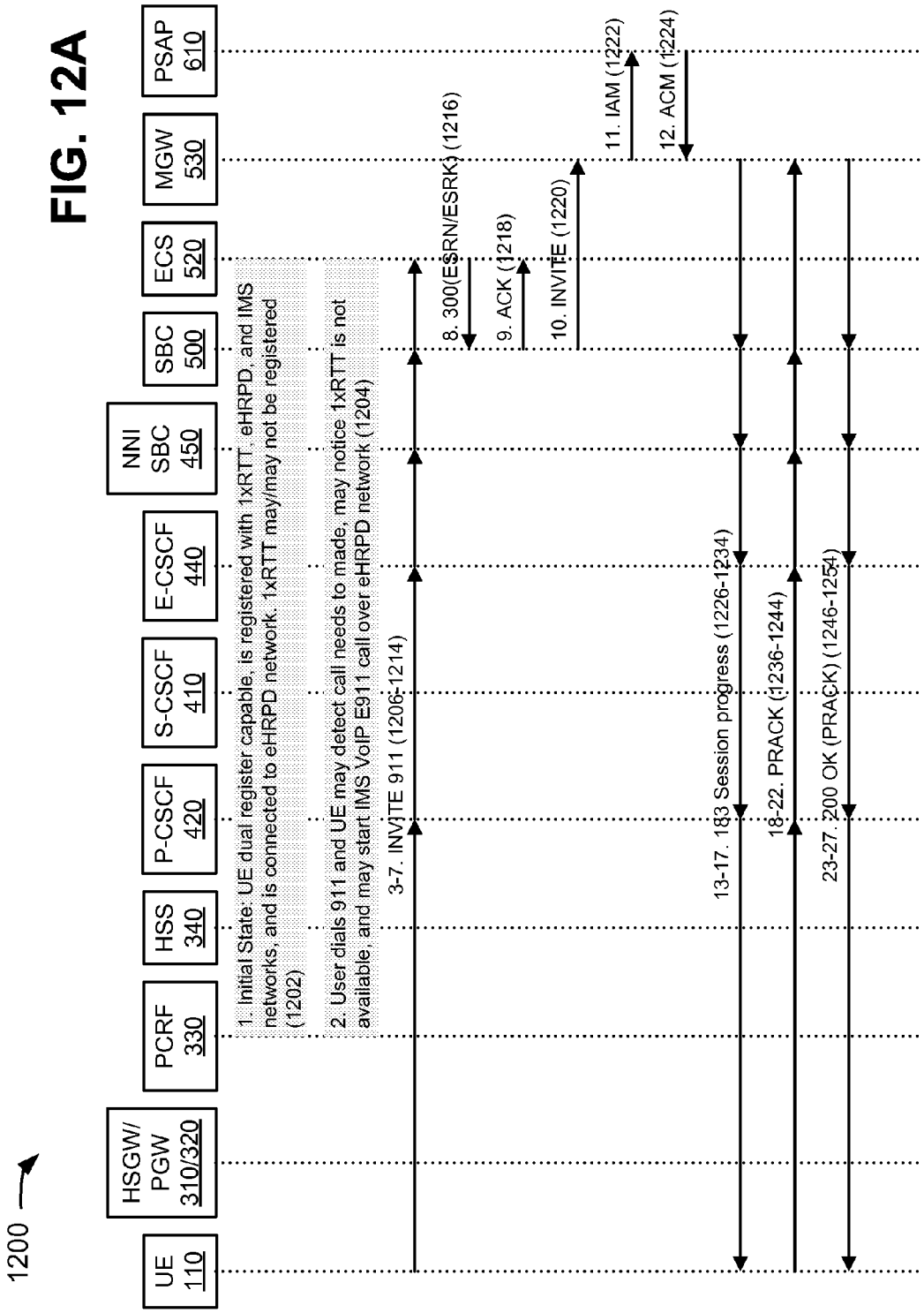

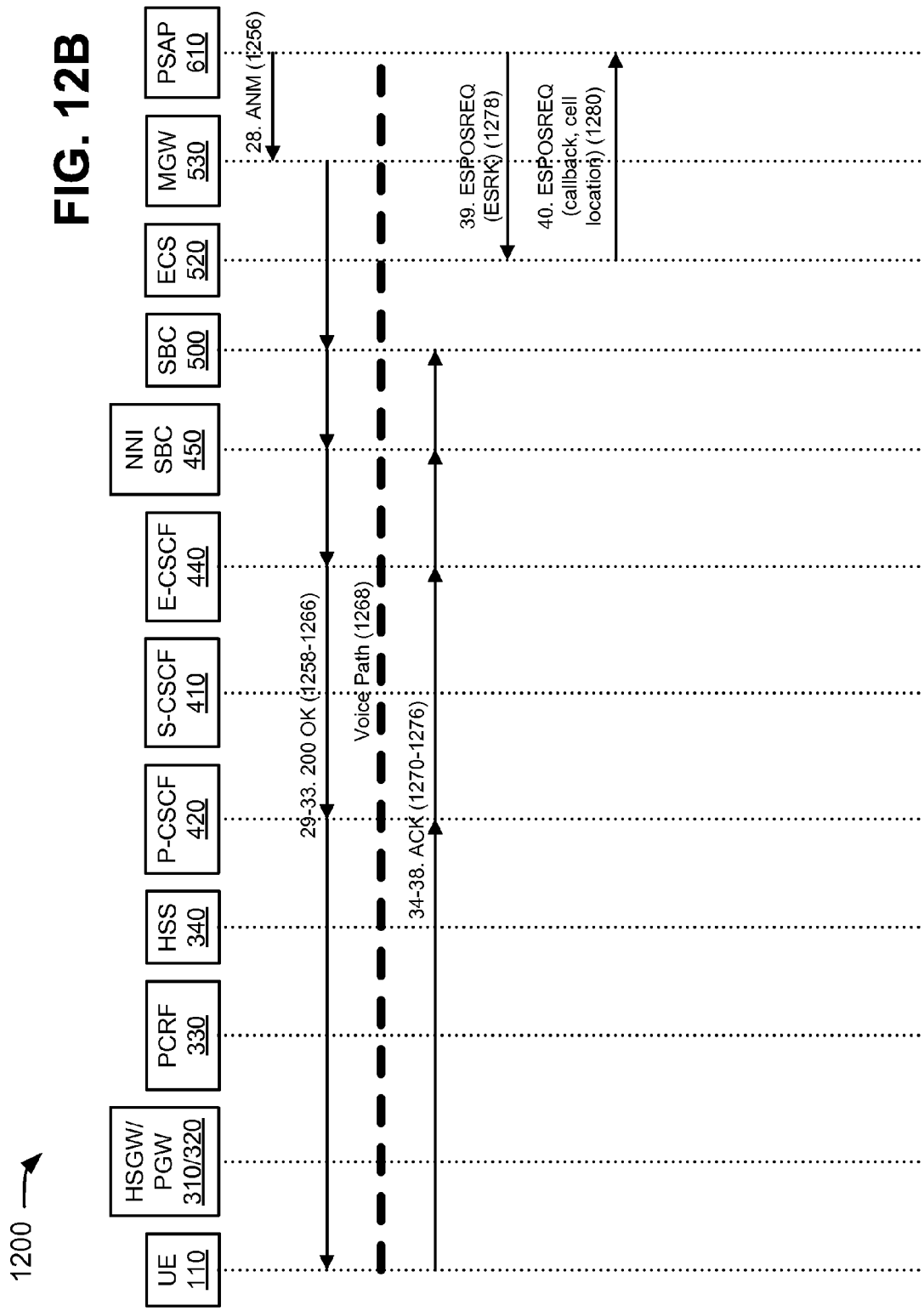

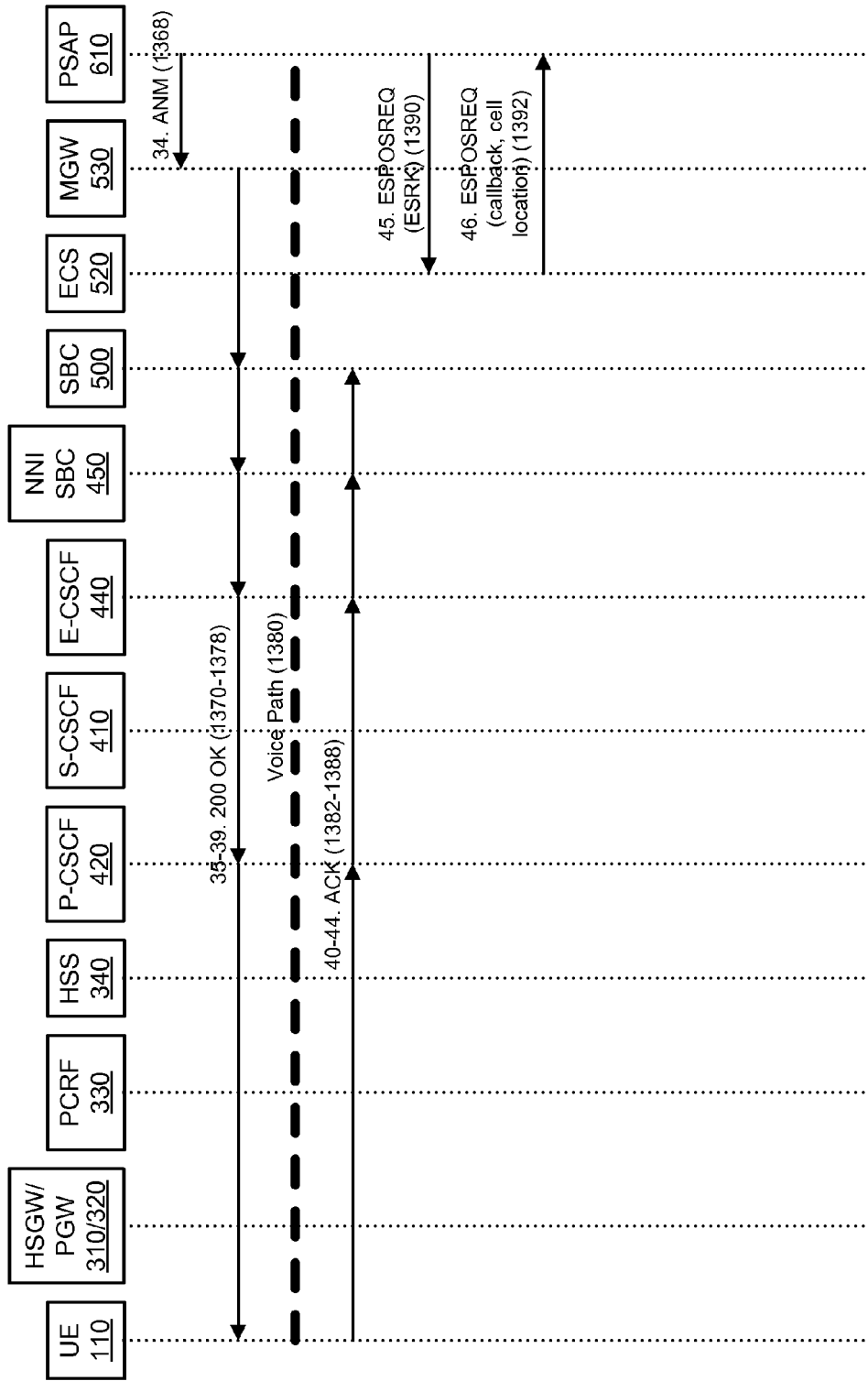

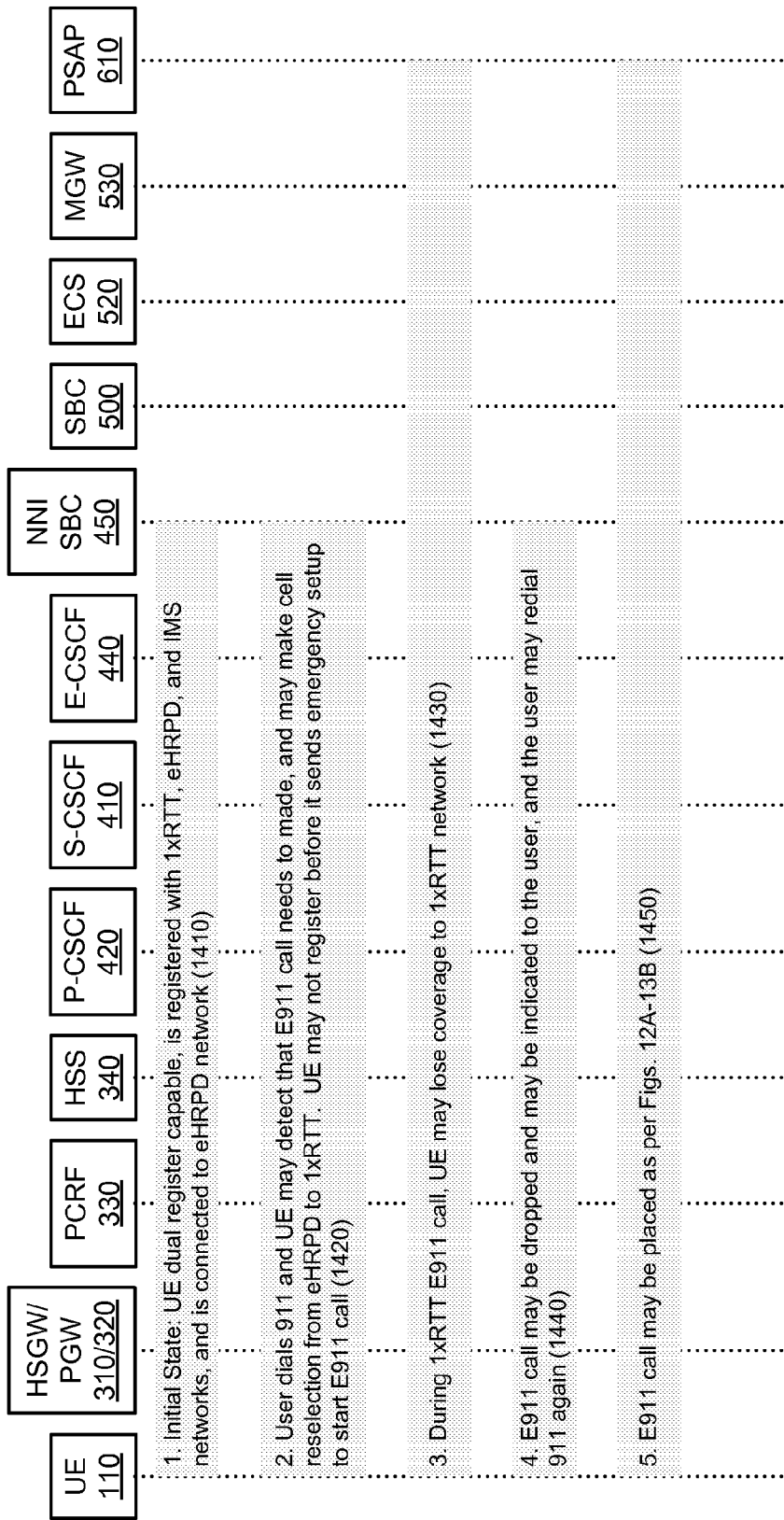

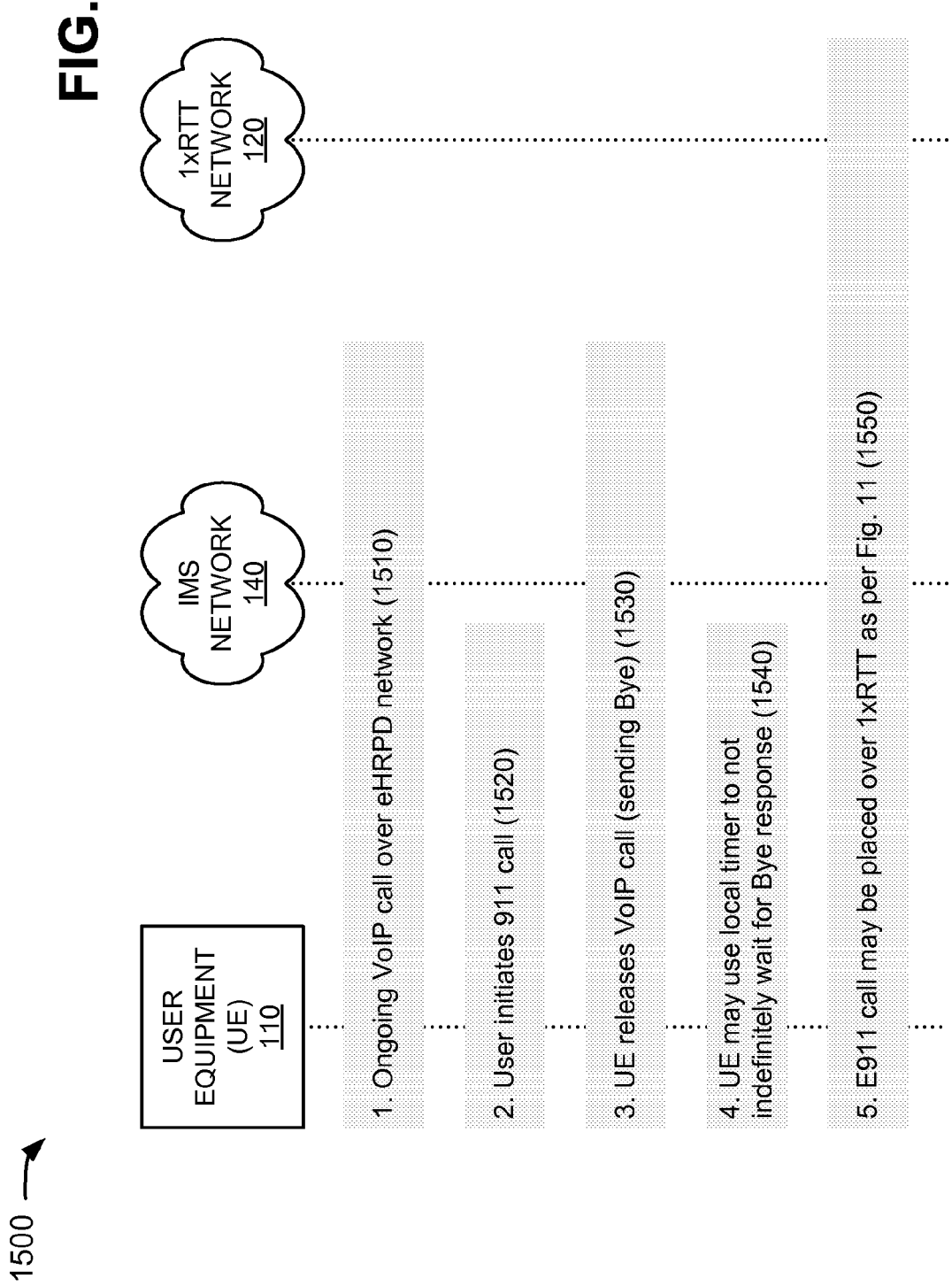

EMERGENCY CALLS FOR INTERNET PROTOCOL MULTIMEDIA SUBSYSTEM (IMS) OVER PACKET SWITCHED CODE DIVISION MULTIPLE ACCESS (CDMA) NETWORKS

BACKGROUND

In code division multiple access (CDMA) mobile wireless networks, voice services are predominantly carried over single-carrier radio transmission technology (1xRTT) networks (e.g., circuit switched CDMA networks). Comprehensive emergency service support has been put in place in 1xRTT networks for carrying emergency (e.g., "911") calls. This includes routing an emergency call to a correct public safety answering point (PSAP) and allowing the PSAP to retrieve a caller's callback number, mobile cell/sector location (e.g., a "phase 1 location") and a caller's global positioning system (GPS) location (e.g., a "phase 2 location").

As a quality of service (QoS) becomes available for packet switched CDMA networks (e.g., referred to as high rate packet data (HRPD) Rev. A networks), voice over Internet protocol (VoIP) over HRPD networks becomes possible. Some mobile service providers have deployed packet VoIP over HRPD Rev. A networks using an evolved HRPD (eHRPD) packet architecture. eHRPD provides further enhancements to HRPD Rev. A core network architecture such that eHRPD can support roaming with long term evolution (LTE). IP multimedia subsystem (IMS) is an architecture developed so that IP networks can rapidly deploy new IP-based multimedia services. IMS over eHRPD (e.g., over HRPD Rev. A) will evolve current HRPD networks into IP multi-media networks. The term "eHRPD," as used herein, may refer to eHRPD over HRPD Rev. A.

For IMS over eHRPD, user equipment (UE) (e.g., mobile communication devices, cell phones, mobile terminals, mobile handsets, personal digital assistants (PDAs), etc.) may be deployed in a dual mode such that the UE can use either a 1xRTT network or an eHRPD network to obtain voice service (e.g., depending on network availability at a particular location). Emergency calls need to be supported in such 1xRTT and eHRPD networks. Due to lack of sufficient standard and the significant time and effort required to implement a native emergency support over eHRDP networks, a generally accepted solution is using the 1xRTT network (e.g., as a "fallback") to carry an emergency call even when the emergency call is initiated by the UE in an eHRPD mode. One way to perform this "fallback" is to have the UE recognize a call as an emergency call by determining whether dialed digits are a predefined dial string (e.g., such as "911"). Once the UE recognizes an emergency call, instead of allowing the emergency call to proceed over the eHRPD network, the UE will revert back to the 1xRTT network to initiate the emergency call.

Using the 1xRTT network as a fallback works only if the 1xRTT network always has better coverage than the eHRPD network and the 1xRTT network is available for the emergency call. Since 1xRTT networks have been much more extensively deployed than eHRPD networks, a 1xRTT network may typically have better coverage than an eHRPD network. However, there is no guarantee that, for every location of the UE, a 1xRTT network is always available for an emergency call and has better coverage than an available eHRPD network.

For example, an eHRPD network may be available and a 1xRTT network may not be available (e.g., at a particular location and/or time period) due to radio signal complications (e.g., caused by propagation or reflection of radio signals). In another example, during a natural disaster (e.g., since most people have 1xRTT handsets or UEs), the 1xRTT network may be overloaded and unavailable while the eHRPD network may still have capacity. In still another example, due to planned events (e.g., equipment upgrade) or unplanned events (e.g., equipment malfunction), a 1xRTT network may be unavailable while an eHRPD network may not be affected. In these examples, eHRPD UEs will still be able to make normal VoIP calls over the eHRPD network, however, if the UEs rely on falling back to the 1xRTT network for emergency calls, the emergency calls will fail.

BRIEF DESCRIPTION OF THE DRAWINGS

FIGS. 11-22 depict exemplary diagrams of call flows among exemplary portions of the network depicted in FIG. 1 and according to implementations described herein;

DETAILED DESCRIPTION OF PREFERRED EMBODIMENTS

Figure 1:
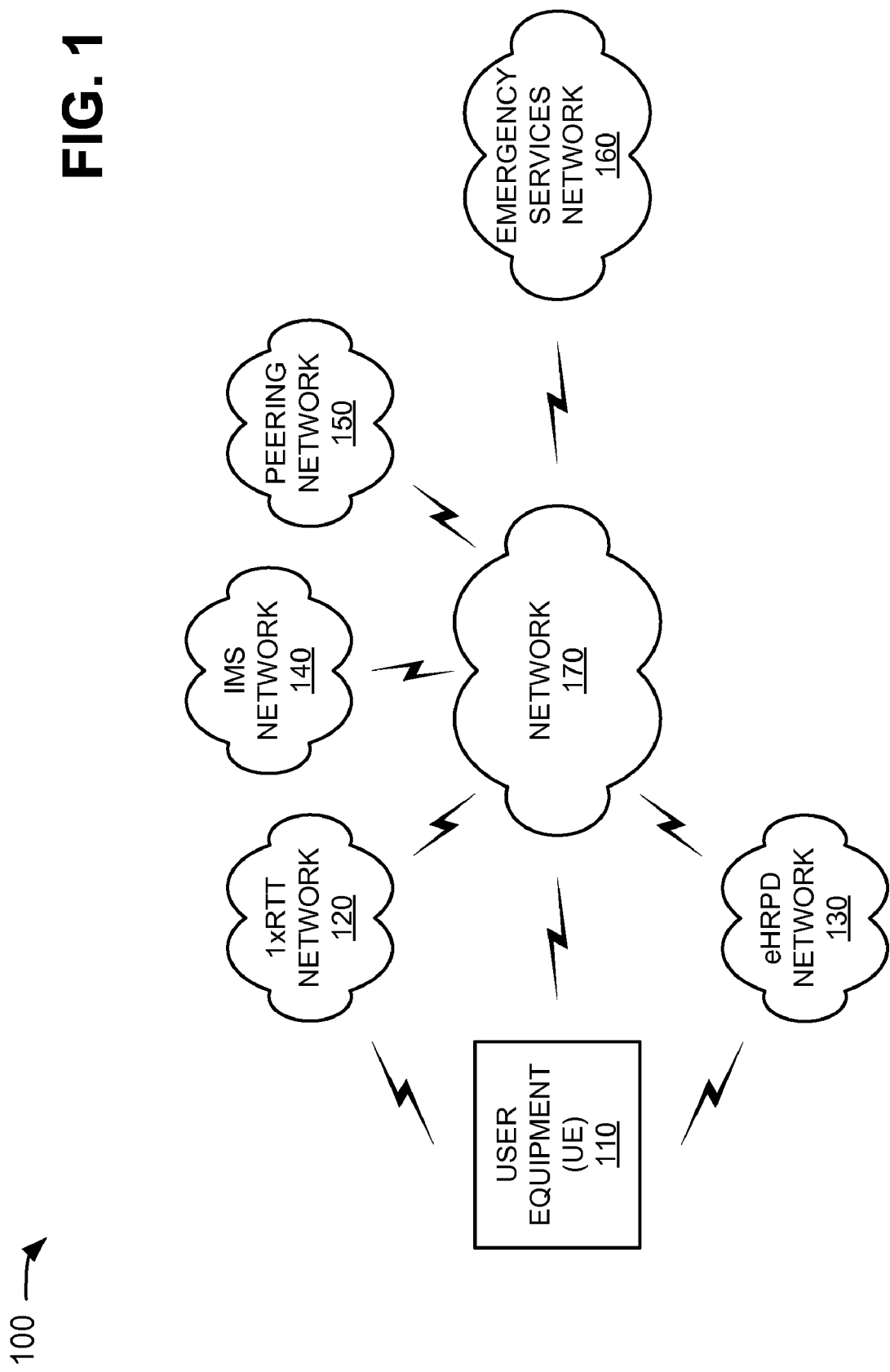
FIG. 1 depicts a diagram of an exemplary network in which systems and/or methods described herein may be implemented.

The following detailed description refers to the accompanying drawings. The same reference numbers in different drawings may identify the same or similar elements. Also, the following detailed description does not limit the invention.

Implementations described herein may provide systems and/or methods that may support emergency services in IMS over eHRPD and 1xRTT networks. The systems and/or methods described herein may rely on falling back to a 1xRTT network as a primary mode of supporting an emergency call, but may be enhanced to support an emergency call over an eHRPD network when the 1xRTT network is not available (e.g., or does not have as much coverage as the eHRPD network). With this enhancement, an emergency (e.g., "911") caller may not be stranded if the 1xRTT network is not available and the eHRPD network is available. Thus, the systems and/or methods described herein may offer an advantage to users of dual-mode UEs (e.g., UEs connectable to 1xRTT and eHRPD networks) compared to users of single-mode UEs (e.g., UEs connectable to only a 1xRTT network). The enhancement provided by the systems and/or methods may be easily and inexpensively implemented. Furthermore, the systems and/or methods described herein may enable a UE to route an emergency call to a correct PSAP, to provide a callback number and a phase 1 location (e.g., a cell/sector address serving the caller), and to efficiently coordinate use of the 1xRTT and eHRPD networks for carrying the emergency call while minimizing post-dial delay.

In one exemplary implementation, a UE may receive initiation of an emergency call (e.g., a "911" call) by a user of the UE, and may determine whether the UE is dual registered with a 1xRTT network and an eHRPD network or is registered with an IMS network. If the UE is not dual registered and is not registered with an IMS network, the UE may use a "legacy" enhanced 911 (E911) (e.g., a location technology that enables UEs to process emergency calls and enables emergency services to locate a geographic position of a caller) method to route the emergency call. If the UE is dual registered or is registered with an IMS network, the UE may determine whether the 1xRTT network is available. If the 1xRTT network is available, the UE may route the emergency call over the 1xRTT network and may determine whether the emergency call is connected via the 1xRTT network. If the emergency call is connected via the 1xRTT network, the UE may connect the emergency call to a PSAP via the 1xRTT network, and, when the emergency call (e.g., via the 1xRTT network) ends, may remain in an emergency callback mode (ECM) for a particular time period. If the 1xRTT network is not available or if the emergency call is not connected via the 1xRTT network, the UE may route the emergency call over eHRPD and IMS networks and may connect the emergency call (e.g., as a VoIP call) to a PSAP via the eHRPD/IMS networks. When the emergency call (e.g., via the eHRPD/IMS networks) ends, the UE may remain in the emergency callback mode for a particular time period.

As used herein, the terms "user," "caller," and "subscriber" are intended to be broadly interpreted to include user equipment (UE) or a user of user equipment.

FIG. 1 is a diagram of an exemplary network 100 in which systems and/or methods described herein may be implemented. As illustrated, network 100 may include a user equipment (UE) 110, a 1xRTT network 120, an eHRPD network 130, an IMS network 140, a peering network 150, and an emergency services network 160 interconnected by a network 170. Components of network 100 may interconnect via wired and/or wireless connections. A single UE 110, 1xRTT network 120, eHRPD network 130, IMS network 140, peering network 150, emergency services network 160, and network 170 have been illustrated in FIG. 1 for simplicity. In practice, there may be more UEs 110, 1xRTT networks 120, eHRPD networks 130, IMS networks 140, peering networks 150, emergency services networks 160, and/or networks 170. Also, in some instances, one or more of the components of network 100 may perform one or more functions described as being performed by another one or more of the components of network 100.

UE 110 may include a radiotelephone, a personal communications system (PCS) terminal (e.g., that may combine a cellular radiotelephone with data processing and data communications capabilities), a wireless telephone, a cellular telephone, a smart phone, a PDA (e.g., that can include a radiotelephone, a pager, Internet/intranet access, etc.), a laptop computer (e.g., with a broadband air card), or other types of mobile communication devices. In an exemplary implementation, UE 110 may include a mobile communication device that is capable of supporting emergency services in IMS (e.g., IMS network 140) over 1xRTT network 130 and eHRPD network 140. UE 110 may rely on falling back to 1xRTT network 120 as a primary mode of supporting an emergency call (e.g., a "911" or "E911" call), but may be enhanced to support an emergency call over eHRPD network 130 when 1xRTT network 120 is not available (e.g., or does not have as good of coverage as eHRPD network 130).

1xRTT network 120 may include one or more computation or communication devices that gather, process, search, and/or provide information in a manner described herein. In an exemplary implementation, 1xRTT network 120 may include a circuit switched CDMA network that utilizes a core CDMA2000 wireless air interface standard, and includes one or more base stations, radio network controllers (RNCs), mobile switching centers (MSCs), home location registers (HLRs), mobile position centers (MPCs), and positioning determination entities (PDEs) (e.g., location servers). Further details of 1xRTT network 120 are provided below in connection with, for example, FIG. 2.

eHRPD network 130 may include one or more computation or communication devices that gather, process, search, and/or provide information in a manner described herein. In an exemplary implementation, eHRPD network 130 may include a packet switched CDMA network that includes one or more base stations, HRPD serving gateways (HSGWs), packet data network gateways (PDN-GWs), policy and charging rule functions (PCRFs), and home subscriber server front ends (HSS-FEs). Further details of eHRPD network 130 are provided below in connection with, for example, FIG. 3.

IMS network 140 may include one or more computation or communication devices that gather, process, search, and/or provide information in a manner described herein. In an exemplary implementation, IMS network 140 may include a network that delivers IP multimedia services via one or more protocols (e.g., via a session initiation protocol (SIP)), and includes one or more interrogating call session control functions (I-CSCFs), serving call session control functions (S-CSCFs), proxy call session control functions (P-CSCFs), call delivery application servers (CDASs), emergency call session control functions (E-CSCFs), primary network-network interface session border controls (NNI-SBCs), and secondary NNI-SBCs. Further details of IMS network 140 are provided below in connection with, for example, FIG. 4.

Peering network 150 may include one or more computation or communication devices that gather, process, search, and/or provide information in a manner described herein. In an exemplary implementation, peering network 150 may include a network that provides emergency data management, network transaction, emergency call handling, and notification services. Peering network 150 may include one or more primary SBCs, secondary SBCs, enhanced communication servers (ECSs), media gateways (MGWs), emergency services gateways (ESGs), and emergency call relay centers (ECRCs). Further details of peering network 150 are provided below in connection with, for example, FIG. 5.

Emergency services network 160 may include one or more computation or communication devices that gather, process, search, and/or provide information in a manner described herein. In an exemplary implementation, emergency services network 160 may include a network that provides emergency services (e.g., fire, police, ambulance, etc. services) in the event of an emergency call. Emergency services network 160 may include one or more selective routers (SRs), PSAPs, and automatic location identification (ALI) database servers. Further details of emergency services network 160 are provided below in connection with, for example, FIG. 6.

Network 170 may include a local area network (LAN), a wide area network (WAN), a metropolitan area network (MAN), a telephone network, such as the Public Switched Telephone Network (PSTN), a cellular network, a Wi-Fi network, an intranet, the Internet, an optical fiber (or fiber optic)-based network, or a combination of networks. In one exemplary implementation, network 170 may include a network that supports support emergency services in IMS (e.g., via IMS network 140) over 1xRTT network 120 and eHRPD network 130.

Although FIG. 1 shows exemplary components of network 100, in other implementations, network 100 may contain fewer, different, differently arranged, or additional components than depicted in FIG. 1.

Figure 2:
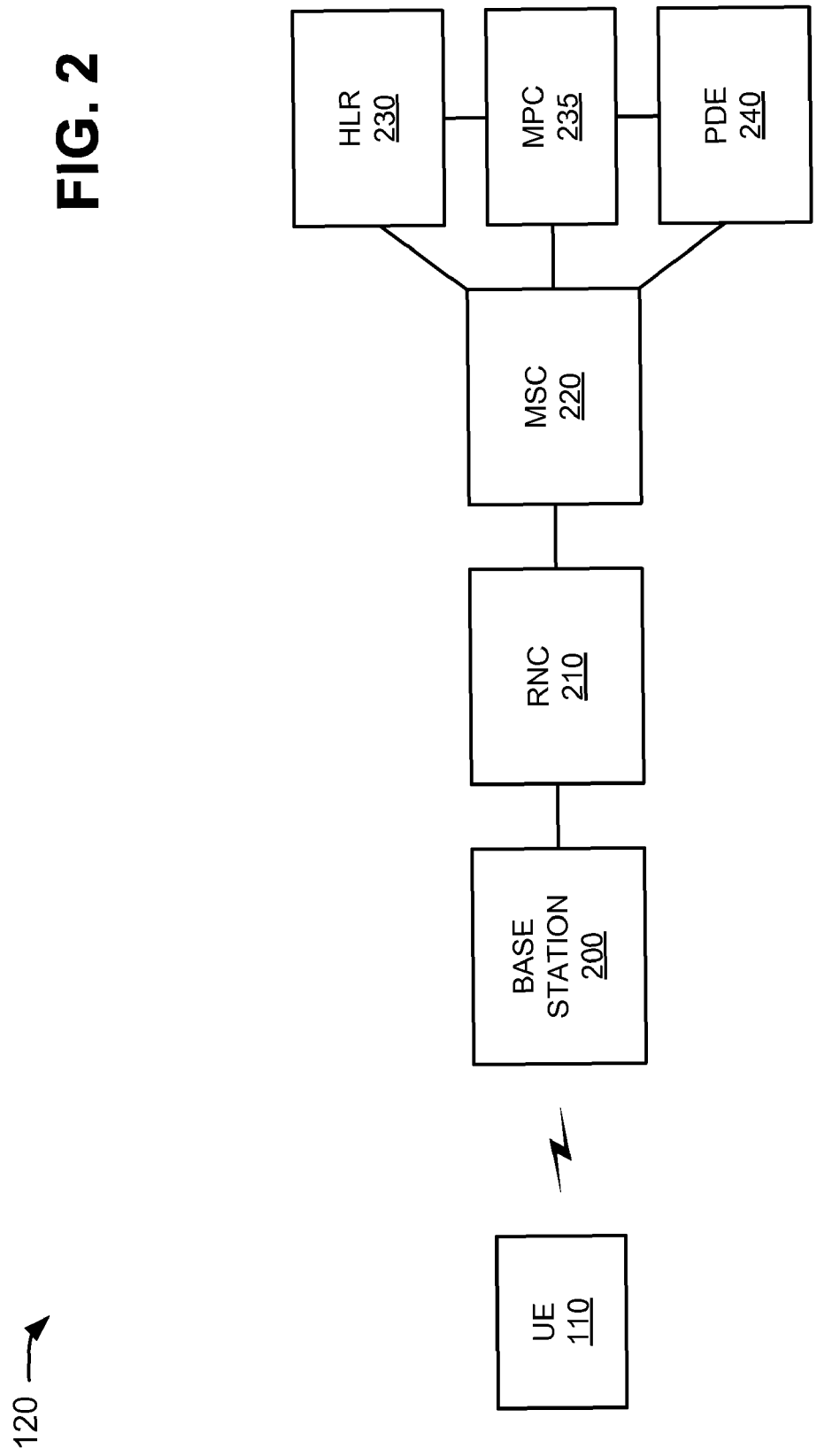
FIG. 2 illustrates a diagram of exemplary devices of a 1xRTT network depicted in FIG. 1.

FIG. 2 illustrates a diagram of exemplary devices of 1xRTT network 120. As shown, 1xRTT network 120 may include a base station 200 (e.g., that communicates with UE 110), a RNC 210, a MSC 220, a HLR 230, a MPC 235, and a PDE 240 that may be interconnected via wired and/or wireless connections.

Base station 200 may include one or more devices that may receive voice and/or data from RNC 210 and may transmit that voice and/or data to UE 110 via an air interface. Base station 200 may also receive voice and/or data from UE 110 over an air interface and may transmit that voice and/or data to RNC 210 or other UEs.

RNC 210 may include one or more devices that may control and manage one or more base stations (e.g., base station 200), and may perform data processing to manage utilization of radio network services. RNC 210 may transmit/receive voice and data to/from base station 200, other RNCs, and/or MSC 220.

MSC 220 may include a data transfer device (or network device), such as a gateway, a router, a switch, a firewall, a network interface card (NIC), a hub, a bridge, a proxy server, an optical add-drop multiplexer (OADM), or some other type of device that processes and/or transfers data. In an exemplary implementation, MSC 220 may transmit/receive voice and data to/from RNC 210, may query HLR 230 for user registration state and MPC 235 for call routing information, and may assist PDE 240 in communicating with UE 110 so that PDE 240 may obtain UE's 110 location. MSC 220 may connect calls by switching digital voice data packets from one network path to another, and may provide information that supports mobile service subscribers, such as user registration and authentication information.

HLR 230 may include one or more server devices, or other types of computation or communication devices, that gather, process, search, and/or provide information in a manner described herein. In an exemplary implementation, HLR 230 may include one or more databases of subscriber information for a mobile network (e.g., 1xRTT network 120). HLR 230 databases may be maintained by a subscriber's home carrier and may include pertinent user information, such as address information, account status information, user preferences information, etc. HLR 230 may interact with MSC 220 to provide MSC 220 with subscriber information requested by MSC 220.

MPC 235 may include one or more server devices, or other types of computation or communication devices, that gather, process, search, and/or provide information in a manner described herein. In an exemplary implementation, MPC 235 may receive routing query from MSC 220. MPC 235 may provide routing information and a PSAP query key based on cell/sector information of the caller back to MSC 220, which routes the emergency call to the PSAP. MPC 235 may then instruct PDE 240 to obtain UE's 110 location and may wait for the PSAP to query the caller's GPS location.

PDE 240 may include one or more server devices (e.g., location servers), or other types of computation or communication devices, that gather, process, search, and/or provide information in a manner described herein. In an exemplary implementation, PDE 230 may provide a secure user plane location (SUPL) platform (or other similar platforms) that may interact with UE 110 (or network platforms) to obtain a location (e.g., global positioning system (GPS) coordinates) associated with UE 110.

Although FIG. 2 shows exemplary devices of 1xRTT network 120, in other implementations, 1xRTT network 120 may contain fewer, different, differently arranged, or additional devices than depicted in FIG. 2. In still other implementations, one or more devices of 1xRTT network 120 may perform one or more other tasks described as being performed by one or more other devices of 1xRTT network 120.

Figure 3:
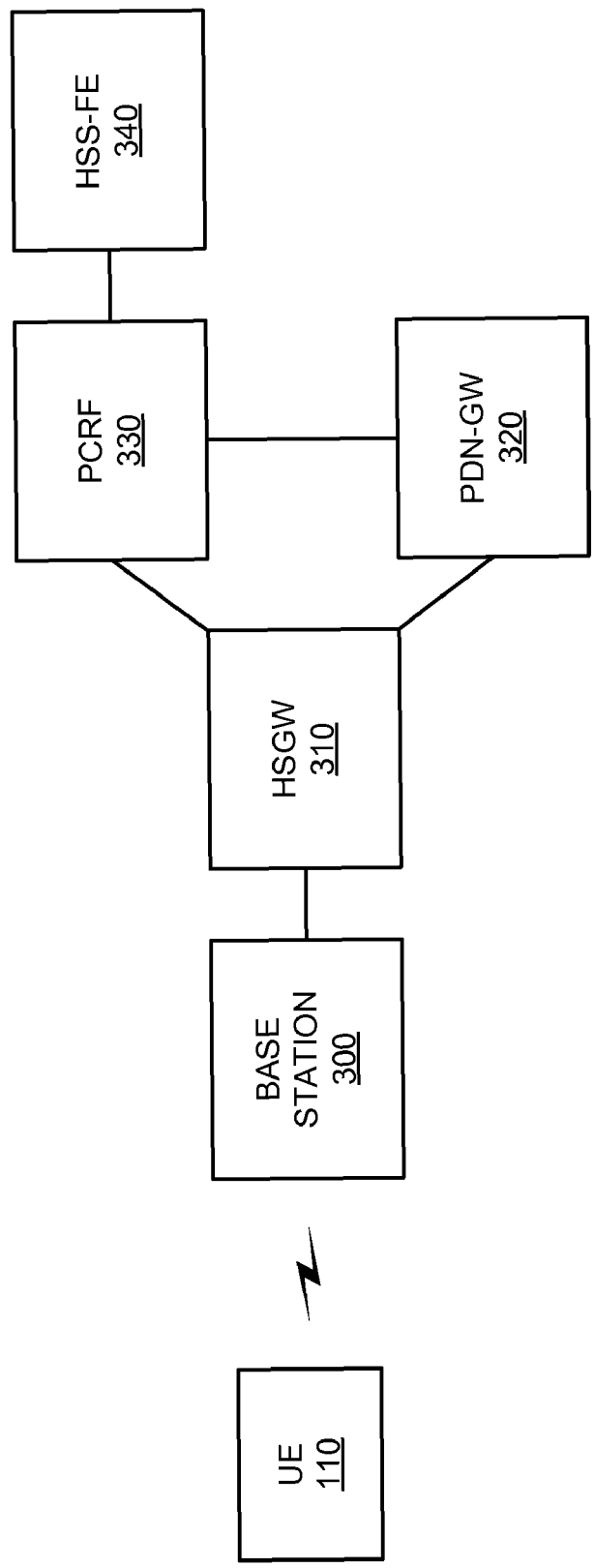
FIG. 3 depicts a diagram of exemplary devices of an eHRPD network illustrated in FIG. 1.

FIG. 3 depicts a diagram of exemplary devices of eHRPD network 130. As shown, eHRPD network 130 may include a base station 300 (e.g., that communicates with UE 110), a HSGW 310, a PDN-GW 320, a PCRF 330, and a HSS-FE 340 that may be interconnected via wired and/or wireless connections.

Base station 300 may include one or more devices that may receive voice and/or data from HSGW 310 and may transmit that voice and/or data to UE 110 via an air interface. Base station 300 may also receive voice and/or data from UE 110 over an air interface and may transmit that voice and/or data to HSGW 310 or other UEs.

HSGW 310 may include a data transfer device (or network device), such as a gateway, a router, a switch, a firewall, a NIC, a hub, a bridge, a proxy server, an OADM, or some other type of device that processes and/or transfers data. In an exemplary implementation, HSGW 310 may control and manage one or more base stations (e.g., base station 300), and may perform data processing to manage utilization of radio network services. HSGW 310 may transmit/receive voice and data to/from base station 300, other HSGWs, PDN-GW 320, and/or PCRF 330. HSGW 310 may provide a local anchor point for inter-base station handover, and may provide IP routing and forwarding functions.

PDN-GW 320 may include a data transfer device (or network device), such as a gateway, a router, a switch, a firewall, a NIC, a hub, a bridge, a proxy server, an OADM, or some other type of device that processes and/or transfers data. In an exemplary implementation, PDN-GW 320 may terminate towards a PDN (e.g., IMS network 140). PDN-GW 320 may perform policy enforcement, per-user based packet filtering (e.g., by deep packet inspection), charging support, lawful interception, UE 110 IP address allocation, packet screening, etc.

PCRF 330 may include one or more server devices, or other types of computation or communication devices, that gather, process, search, and/or provide information in a manner described herein. In an exemplary implementation, PCRF 330 may act as a policy decision point for policy and charging control of service data flows and IP bearer resources.

HSS-FE 340 may include one or more server devices, or other types of computation or communication devices, that gather, process, search, and/or provide information in a manner described herein. In an exemplary implementation, HSS-FE 340 may include one or more user databases that support IMS network 140 entities that handle calls. The one or more databases of HSS-FE 340 may include subscription-related information (e.g., subscriber profiles). HSS-FE 340 may perform authentication and authorization of a user, and may provide information about the user's (e.g., UE's 110) location and IP information.

Although FIG. 3 shows exemplary devices of eHRPD network 130, in other implementations, eHRPD network 130 may contain fewer, different, differently arranged, or additional devices than depicted in FIG. 3. In still other implementations, one or more devices of eHRPD network 130 may perform one or more other tasks described as being performed by one or more other devices of eHRPD network 130.

Figure 4:
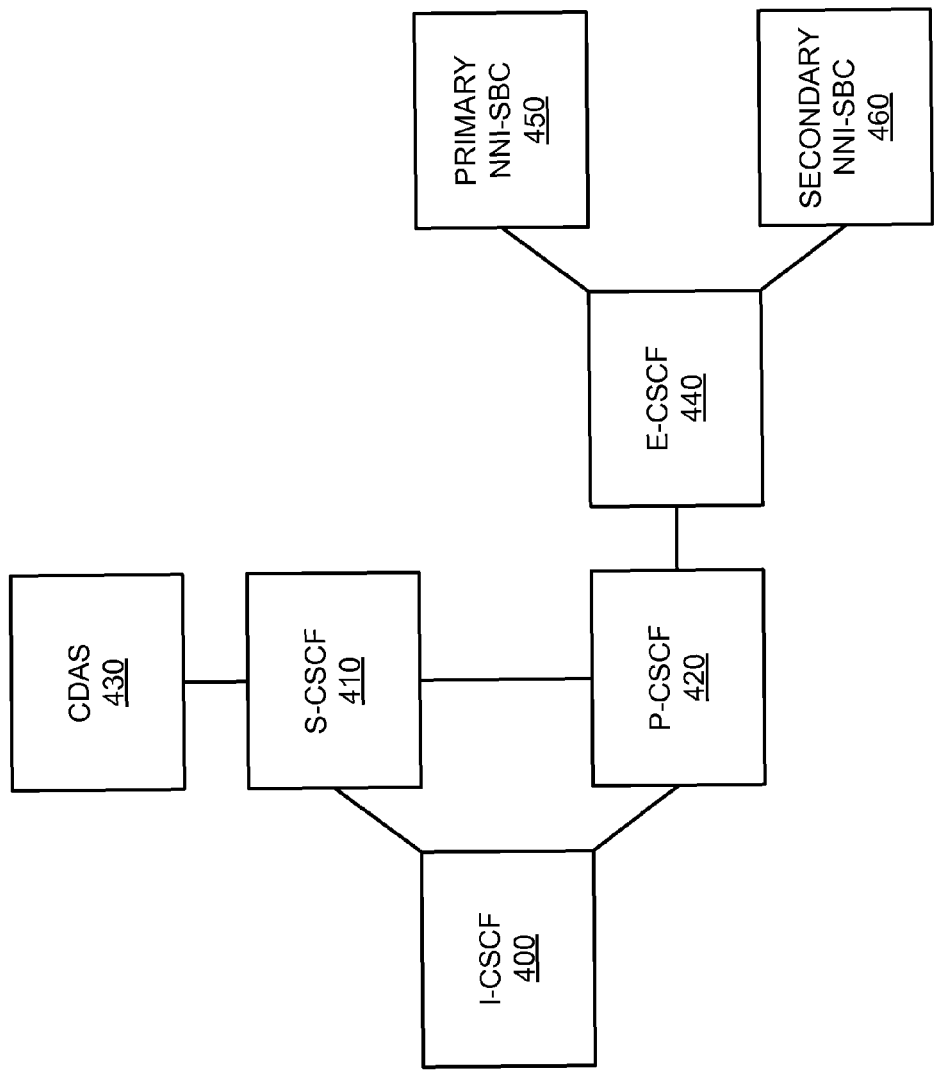
FIG. 4 illustrates a diagram of exemplary devices of an IMS network depicted in FIG. 1.

FIG. 4 illustrates a diagram of exemplary devices of IMS network 140. As shown, IMS network 140 may include an I-CSCF 400, a S-CSCF 410, a P-CSCF 420, a CDAS 430, an E-CSCF 440, a primary NNI-SBC 450, and a secondary NNI-SBC 460 that may be interconnected via wired and/or wireless connections.

I-CSCF 400 may include one or more server devices, or other types of computation or communication devices, that gather, process, search, and/or provide information in a manner described herein. In an exemplary implementation, I-CSCF 400 may provide a SIP function and may be located at the edge of eHRPD network 130 (e.g., near HSS-FE 340). An IP address of I-CSCF 400 may be published in a Domain Name System (DNS) so that remote servers can find I-CSCF 400 and use I-CSCF 400 as a forwarding point for SIP packets. I-CSCF 400 may query one or more databases stored in HSS-FE 340 to retrieve a user location, and may then route a SIP request to its assigned S-CSCF (e.g., S-CSCF 410).

S-CSCF 410 may include one or more server devices, or other types of computation or communication devices, that gather, process, search, and/or provide information in a manner described herein. In an exemplary implementation, S-CSCF 410 may be a central node of the signaling plane, and may perform session control. S-CSCF 410 may handle SIP registrations, may inspect signaling messages, may decide to which application server(s) a SIP message may be forwarded, may provide routing services, etc.

P-CSCF 420 may include one or more server devices, or other types of computation or communication devices, that gather, process, search, and/or provide information in a manner described herein. In an exemplary implementation, P-CSCF 420 may function as a proxy server for UE 110, where SIP signaling traffic to and from UE 110 may go through P-CSCF 420. P-CSCF 420 may validate and then forward requests from UE 110, and may process and forward responses to UE 110.

CDAS 430 may include one or more server devices, or other types of computation or communication devices, that gather, process, search, and/or provide information in a manner described herein. In an exemplary implementation, CDAS 430 may provide a roaming and call delivery function using two strategies. In a first strategy, CDAS 430 may direct a call to UE 110 via IMS network 140 if UE 110 is registered in IMS network 140. If UE 110 is not found in IMS network 140, CDAS 430 may query HLR 230 with standard procedures for a wireless circuit network routing number. The call may then be routed out of IMS network 140 to a circuit network (e.g., 1xRTT network 120) via the retrieved routing number. This strategy may permit UE 110 to be registered simultaneously in 1xRTT network 120 and IMS network 140. In a second strategy, when UE 110 is registered for service with IMS network 140, CDAS 430 may provide specified procedures for registration with HLR 230. In this way, HLR 230 may view IMS network 140 as a serving or visited system for UE 110 and may retrieve a routing directory number from CDAS 430 when a call is to be delivered to UE 110. In the second strategy, CDAS 430 may support registration of 1xRTT network 120, allocation of the routing directory number, and forwarding of the call to the allocated routing directory number for UE 110.

E-CSCF 440 may include one or more server devices, or other types of computation or communication devices, that gather, process, search, and/or provide information in a manner described herein. In an exemplary implementation, E-CSCF 440 may perform call processing of emergency calls for the IMS architecture. For example, E-CSCF 440 may determine a location of a caller, may determine where to route an emergency call, and may route the emergency call to a correct PSAP.

Primary NNI-SBC 450 may include one or more server devices, or other types of computation or communication devices, that gather, process, search, and/or provide information in a manner described herein. In an exemplary implementation, primary NNI-SBC 450 may include a primary device (e.g., before secondary NNI-SBC 460) that exerts control over signaling and media streams involved in setting up, conducting, and tearing down VoIP calls or other interactive media communications.

Secondary NNI-SBC 460 may include one or more server devices, or other types of computation or communication devices, that gather, process, search, and/or provide information in a manner described herein. In an exemplary implementation, secondary NNI-SBC 450 may include a secondary device (e.g., after primary NNI-SBC 450) that exerts control over signaling and media streams involved in setting up, conducting, and tearing down VoIP calls or other interactive media communications.

Although FIG. 4 shows exemplary devices of IMS network 140, in other implementations, IMS network 140 may contain fewer, different, differently arranged, or additional devices than depicted in FIG. 4. In still other implementations, one or more devices of IMS network 140 may perform one or more other tasks described as being performed by one or more other devices of IMS network 140.

Figure 5:
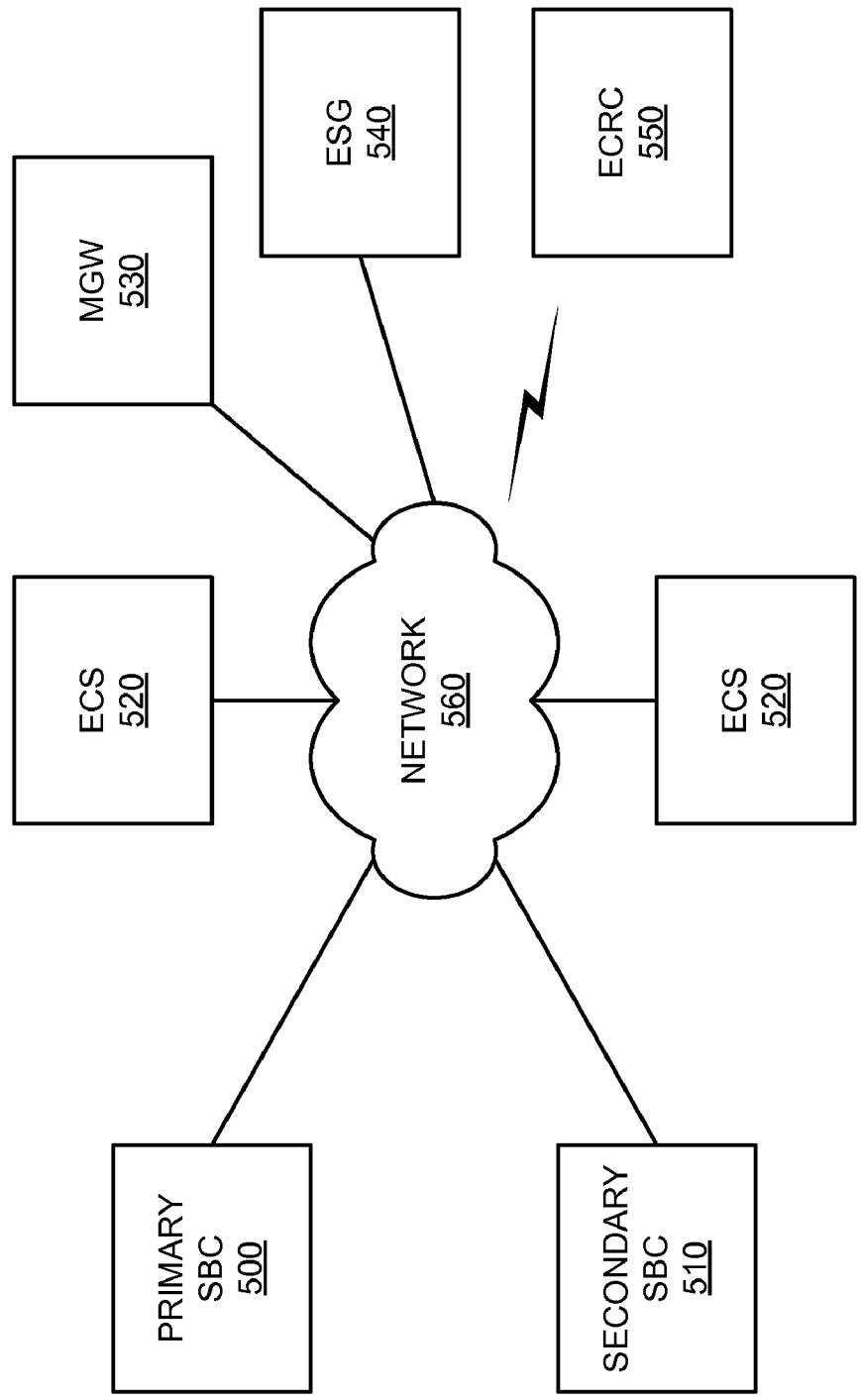
FIG. 5 depicts a diagram of exemplary devices of a peering network illustrated in FIG. 1.

FIG. 5 depicts a diagram of exemplary devices of peering network 150. As shown, peering network 150 may include a primary SBC 500, a secondary SBC 510, two ECSs 520, a MGW 530, an ESG 540, and an ECRC 550 interconnected by a network 560. Devices of peering network 150 may interconnect via wired and/or wireless connections.

Primary SBC 500 may include one or more server devices, or other types of computation or communication devices, that gather, process, search, and/or provide information in a manner described herein. In an exemplary implementation, primary SBC 500 may include a primary device (e.g., before secondary SBC 510) that exerts control over signaling and media streams involved in setting up, conducting, and tearing down calls or other interactive media communications.

Secondary SBC 510 may include one or more server devices, or other types of computation or communication devices, that gather, process, search, and/or provide information in a manner described herein. In an exemplary implementation, secondary SBC 510 may include a secondary device (e.g., after primary SBC 500) that exerts control over signaling and media streams involved in setting up, conducting, and tearing down calls or other interactive media communications.

Each ECS 520 may include one or more server devices, or other types of computation or communication devices, that gather, process, search, and/or provide information in a manner described herein. In an exemplary implementation, each ECS 520 may manage IP telephony and multimedia communication networks, and may enable network managers (e.g., associated with peering network 150) to set policies and control peering network 150 resources (e.g., bandwidth usage) to ensure optimal implementation.

MGW 530 may include a data transfer device (or network device), such as a gateway, a router, a switch, a firewall, a NIC, a hub, a bridge, a proxy server, an OADM, or some other type of device that processes and/or transfers data. In an exemplary implementation, MGW 530 may include a translation device that converts media streams between disparate telecommunications networks (e.g., PSTN, SS7, next generation networks, etc.). MGW 530 may enable multimedia communications across next generation networks over multiple transport protocols such as asynchronous transfer mode (ATM) and IP.

ESG 540 may include a data transfer device (or network device), such as a gateway, a router, a switch, a firewall, a NIC, a hub, a bridge, a proxy server, an OADM, or some other type of device that processes and/or transfers data. In an exemplary implementation, ESG 540 may route an emergency call (e.g., provided to peering network 150) to an appropriate PSAP (e.g., via a selective router).

ECRC 550 may include one or more server devices, or other types of computation or communication devices, that gather, process, search, and/or provide information in a manner described herein. In an exemplary implementation, if UE 110 does not have access to basic 911 or E911 (e.g., because of a problem validating or confirming UE's 110 address, UE 110 is identified with an international location, UE 110 is located in an area that is not covered by a landline 911 network, etc.), emergency calls placed by UE 110 may be sent to ECRC 550. ECRC 550 may receive such emergency calls and experienced emergency call takers associated with ECRC 550 may determine appropriate PSAPs for the emergency calls and may transfer the emergency calls to the determined PSAPs.

Network 560 may include a LAN, a WAN, a MAN, a telephone network, such as the PSTN, a cellular network, a Wi-Fi network, an intranet, the Internet, an optical fiber (or fiber optic)-based network, or a combination of networks.

Although FIG. 5 shows exemplary devices of peering network 150, in other implementations, peering network 150 may contain fewer, different, differently arranged, or additional devices than depicted in FIG. 5. In still other implementations, one or more devices of peering network 150 may perform one or more other tasks described as being performed by one or more other devices of peering network 150.

Figure 6:
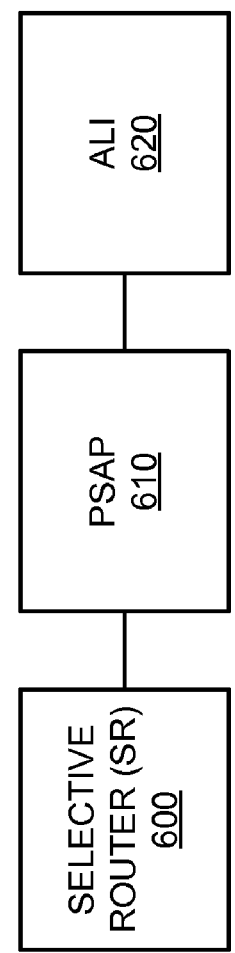
FIG. 6 illustrates a diagram of exemplary devices of an emergency services network depicted in FIG. 1.

FIG. 6 illustrates a diagram of exemplary devices of emergency services network 160. As shown, emergency services network 160 may include a selective router (SR) 600, a PSAP 610, and an ALI database server 620 that may be interconnected via wired and/or wireless connections.

SR 600 may include a data transfer device, such as a gateway, a router, a switch, a firewall, a NIC, a hub, a bridge, a proxy server, an OADM, or some other type of device that processes and/or transfers data. In an exemplary implementation, SR 600 may include routing and equipment used to route an emergency call to the proper PSAP (e.g., PSAP 610).

PSAP 610 may include one or more server devices, or other types of computation or communication devices, that gather, process, search, and/or provide information in a manner described herein. In an exemplary implementation, PSAP 610 may be responsible for answering emergency calls provided via UE 110 (e.g., in IMS network 140 and over 1xRTT network 120 and eHRPD network 130). PSAP 610 may communicate with emergency personnel (e.g., police, fire, and/or ambulance services) (not shown) to provide information associated with emergency calls.

ALI database server 620 (hereinafter referred to as "ALI 620") may include one or more server devices, or other types of computation or communication devices, that gather, process, search, and/or provide information in a manner described herein. In an exemplary implementation, ALI 620 may include a subscriber database that matches phone numbers to names and addresses. When an emergency call arrives at PSAP 610, PSAP 610 may use this database to determine an address that matches a phone number associated with the emergency call.

Although FIG. 6 shows exemplary devices of emergency services network 160, in other implementations, emergency services network 160 may contain fewer, different, differently arranged, or additional devices than depicted in FIG. 6. In still other implementations, one or more devices of emergency services network 160 may perform one or more other tasks described as being performed by one or more other devices of emergency services network 160.

In one exemplary implementation, and with reference to FIGS. 2-6, during a 1xRTT emergency call (e.g., by UE 110), MSC 270 (e.g., of 1xRTT network 120) may query peering network 150 for routing instructions. ECS 520 of peering network 150 may determine a route to a correct PSAP by using a cell identity associated with UE 110. The determined route may be provided back to MSC 270. In the meantime, ECS 520 may query PDE 240 for a location associated with UE 110. When MSC 270 receives the determined route from ECS 520, MSC 270 may route the emergency call (e.g., control and voice) to SR 600 (e.g., of emergency services network 160) over dedicated trunks. SR 600 may route the emergency call to PSAP 610 and a voice path may be established between UE 110 and PSAP 610. Thus, in this scenario (e.g., during a 1xRTT emergency call), voice may routed between MSC 270 (e.g., of 1xRTT network 120) to SR 600 and PSAP 610 (e.g., of emergency services network 160) using 1xRTT network 120. PSAP 610 may request that peering network 150 retrieve UE's 110 location information, and peering network 150 may return the requested location information to PSAP 610.

In another exemplary implementation, and with reference to FIGS. 2-6, during an eHRPD emergency call, E-CSCF 440 may send a call request (e.g., a SIP invite) to peering network 150 for routing instructions. The invite may be sent, via primary NNI-SBC 450, to primary SBC 500 and to ECS 520. ECS 520 may determine a route to a correct PSAP by using a cell identity associated with UE 110. Routing information may be used by primary SBC 500 to establish an emergency call through peering network 150. Primary SBC 500 may route the emergency call (e.g., voice and control) to MGW 530, and MGW 530 may route the emergency call to SR 600 in emergency services network 160. SR 600 may route the emergency call to PSAP 610 and a voice path may be established between UE 110 and PSAP 610. Thus, in this scenario (e.g., during an eHRPD emergency call), voice may be routed between the E-CSCF 440 (e.g., of IMS network 140) through peering network 150 to SR 600 and PSAP 610 (e.g., of emergency services network 160). PSAP 610 may request that peering network 150 retrieve UE's 110 location information, and peering network 150 may return the requested location information to PSAP 610.

Figure 7:
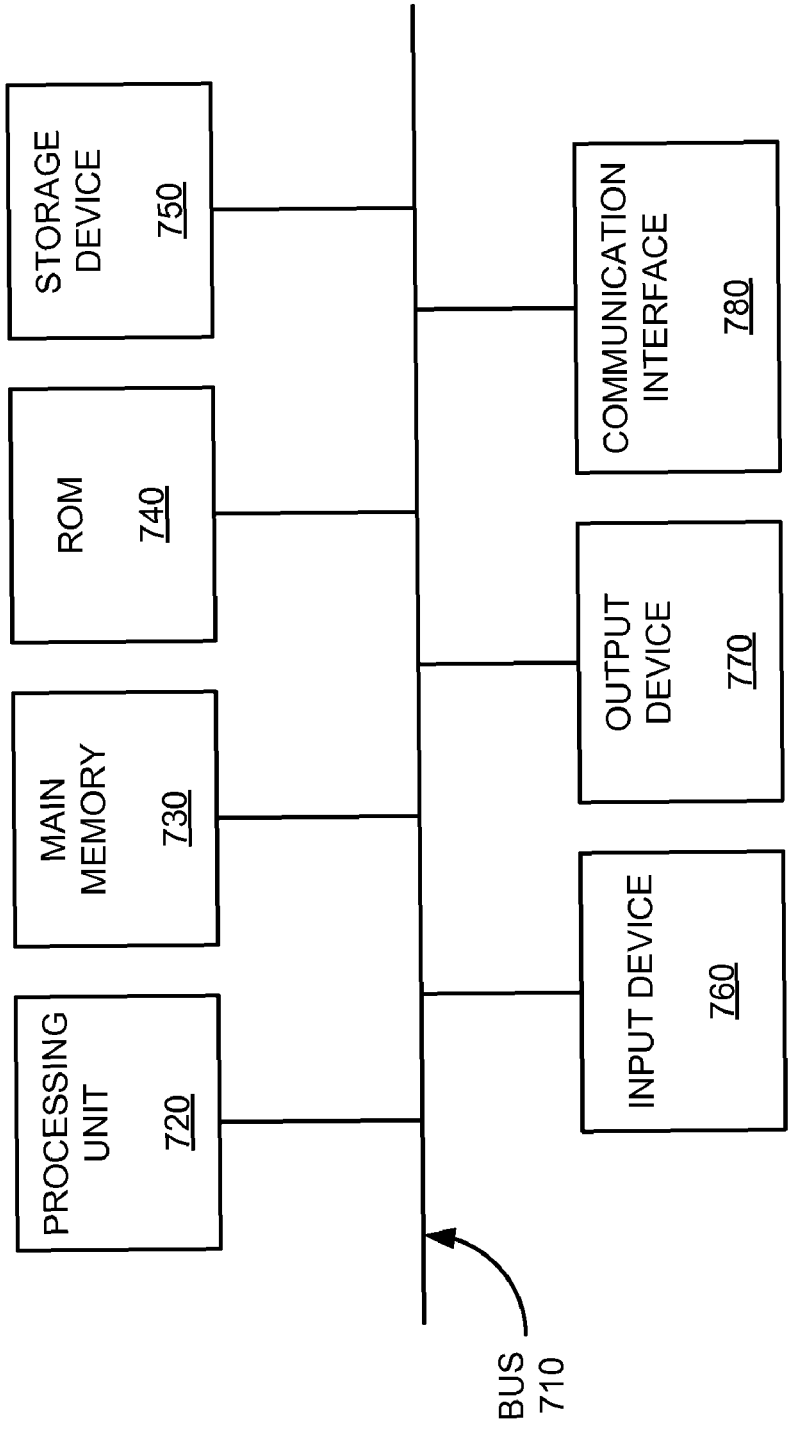
FIG. 7 depicts a diagram of exemplary components of one or more devices of the 1xRTT network, the eHRPD network, the IMS network, the peering network, and the emergency services network illustrated in FIGS. 2-6, respectively.

FIG. 7 is an exemplary diagram of a device 700 that may correspond to one or more of the devices of 1xRTT network 120, eHRPD network 130, IMS network 140, peering network 150, and emergency services network 160. As illustrated, device 700 may include a bus 710, a processing unit 720, a main memory 730, a read-only memory (ROM) 740, a storage device 750, an input device 760, an output device 770, and/or a communication interface 780. Bus 710 may include a path that permits communication among the components of device 700.

Processing unit 720 may include one or more processors, microprocessors, or other types of processing units that may interpret and execute instructions. Main memory 730 may include a random access memory (RAM) or another type of dynamic storage device that may store information and instructions for execution by processing unit 720. ROM 740 may include a ROM device or another type of static storage device that may store static information and/or instructions for use by processing unit 720. Storage device 750 may include a magnetic and/or optical recording medium and its corresponding drive.

Input device 760 may include a mechanism that permits an operator to input information to device 700, such as a keyboard, a mouse, a pen, a microphone, voice recognition and/or biometric mechanisms, etc. Output device 770 may include a mechanism that outputs information to the operator, including a display, a printer, a speaker, etc. Communication interface 780 may include any transceiver-like mechanism that enables device 700 to communicate with other devices and/or systems. For example, communication interface 780 may include mechanisms for communicating with another device or system via a network.

As described herein, device 700 may perform certain operations in response to processing unit 720 executing software instructions contained in a computer-readable medium, such as main memory 730. A computer-readable medium may be defined as a physical or logical memory device. A logical memory device may include memory space within a single physical memory device or spread across multiple physical memory devices. The software instructions may be read into main memory 730 from another computer-readable medium, such as storage device 750, or from another device via communication interface 780. The software instructions contained in main memory 730 may cause processing unit 720 to perform processes described herein. Alternatively, hardwired circuitry may be used in place of or in combination with software instructions to implement processes described herein. Thus, implementations described herein are not limited to any specific combination of hardware circuitry and software.

Although FIG. 7 shows exemplary components of device 700, in other implementations, device 700 may contain fewer, different, differently arranged, or additional components than depicted in FIG. 7. In still other implementations, one or more components of device 700 may perform one or more other tasks described as being performed by one or more other components of device 700.

Figure 8:
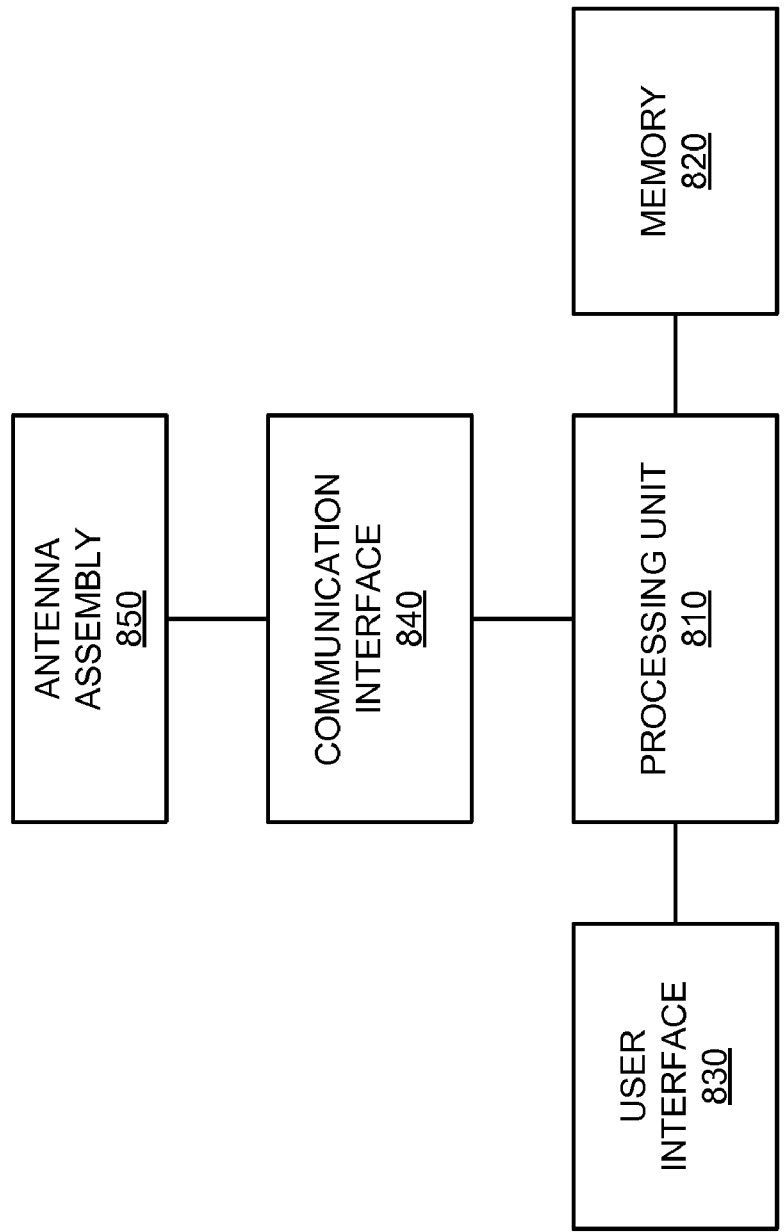
FIG. 8 illustrates a diagram of exemplary components of a user equipment of the network depicted in FIG. 1.

FIG. 8 depicts a diagram of exemplary components of a device 800 that may correspond to, for example, UE 110. As illustrated, device 800 may include a processing unit 810, memory 820, a user interface 830, a communication interface 840, and/or an antenna assembly 850.

Processing unit 810 may include one or more processors, microprocessors, application specific integrated circuits (ASICs), field programmable gate arrays (FPGAs), or the like. Processing unit 810 may control operation of device 800 and its components. In one implementation, processing unit 810 may control operation of components of device 800 in a manner described herein.

Memory 820 may include a RAM, a ROM, and/or another type of memory to store data and instructions that may be used by processing unit 810.

User interface 830 may include mechanisms for inputting information to device 800 and/or for outputting information from device 800. Examples of input and output mechanisms might include buttons (e.g., control buttons, keys of a keypad, a joystick, etc.) or a touch screen interface to permit data and control commands to be input into device 800; a speaker to receive electrical signals and output audio signals; a microphone to receive audio signals and output electrical signals; a display to output visual information (e.g., text input into device 800); and/or a vibrator to cause equipment 800 to vibrate.

Communication interface 840 may include, for example, a transmitter that may convert baseband signals from processing unit 810 to radio frequency (RF) signals and/or a receiver that may convert RF signals to baseband signals. Alternatively, communication interface 840 may include a transceiver to perform functions of both a transmitter and a receiver. Communication interface 840 may connect to antenna assembly 850 for transmission and/or reception of the RF signals.

Antenna assembly 850 may include one or more antennas to transmit and/or receive RF signals over the air. Antenna assembly 850 may, for example, receive RF signals from communication interface 840 and transmit them over the air, and receive RF signals over the air and provide them to communication interface 840. In one implementation, for example, communication interface 840 may communicate with a network and/or devices connected to a network.

As will be described in detail below, device 800 may perform certain operations described herein in response to processing unit 810 executing software instructions of an application contained in a computer-readable medium, such as memory 820. The software instructions may be read into memory 820 from another computer-readable medium or from another device via communication interface 840. The software instructions contained in memory 820 may cause processing unit 810 to perform processes that will be described later. Alternatively, hardwired circuitry may be used in place of or in combination with software instructions to implement processes described herein. Thus, implementations described herein are not limited to any specific combination of hardware circuitry and software.

Although FIG. 8 shows exemplary components of device 800, in other implementations, device 800 may contain fewer, different, differently arranged, or additional components than depicted in FIG. 8. In still other implementations, one or more components of device 800 may perform one or more other tasks described as being performed by one or more other components of device 800.

Figure 9:
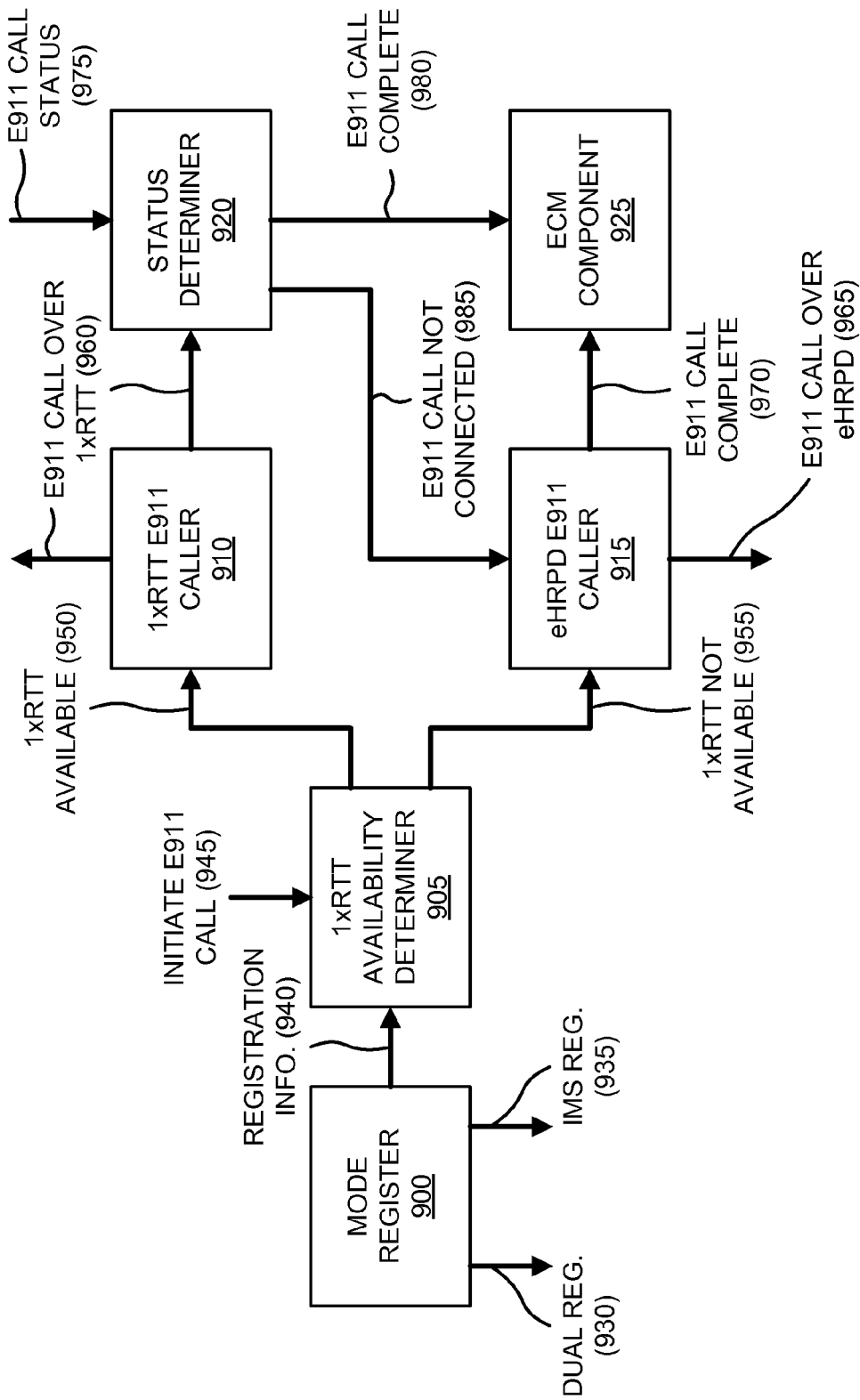
FIG. 9 depicts a diagram of exemplary functional components of the user equipment illustrated in FIG. 1.

FIG. 9 depicts a diagram of exemplary functional components of UE 110. In one implementation, the functions described in connection with FIG. 9 may be performed by one or more of the components of UE 110, as depicted in FIG. 8. As shown in FIG. 9, UE 110 may include a mode register 900, a 1xRTT availability determiner 905, a 1xRTT E911 caller 910, an eHRPD caller 915, a status determiner 920, and an ECM component 925.

Mode register 900 may include hardware or a combination of hardware and software that may determine whether UE 110 is registered in 1xRTT network 120 and eHRPD network 130 (e.g., dual registered 930 in a hybrid mode) or is registered in IMS network 140 (e.g., IMS registered 935). If UE 110 is dual registered 930 or is IMS registered 935, the E911 systems and/or methods described herein may be applied by UE 110. If UE 110 is not dual registered 930 or IMS registered 935, UE 110 may apply a "legacy" E911 method. As further shown in FIG. 9, mode register 900 may provide registration information 940 (e.g., whether UE 110 is dual registered 930 or IMS registered 935) to 1xRTT availability determiner 905.

In one exemplary implementation, UE 110 may be dual register capable such that UE 110 may register with 1xRTT network 120 and eHRPD network 130 when it is switched on. UE 110 may register with IMS network 140 when eHRPD network 130 is available. When UE 110 switches from eHRPD network 130 to 1xRTT network 120, UE 110 may maintain its registration with eHRPD network 130 and IMS network 140. When UE 110 switches from 1xRTT network 120 to eHRPD network 130, UE 110 may perform initial registration or re-registration depending on whether a re-registration timer has expired or a domain notification short message service (SMS) message is sent by UE 110 while on 1xRTT network 120. IMS network 140 registration may be required so that information in CDAS 430 (FIG. 4) may be updated and terminated activities may be routed to eHRPD network 130.

1xRTT availability determiner 905 may include hardware or a combination of hardware and software that may receive registration information 940 from mode register 900, and may receive initiation of an E911 call, as indicated by reference number 945. If registration information 940 indicates that UE 110 is dual registered 930 or IMS registered 935, 1xRTT availability determiner 905 may determine whether 1xRTT network 120 is available to handle the E911 call. If 1xRTT network 120 is determined to be available, 1xRTT availability determiner 905 may provide an indication 950 (e.g., that 1xRTT network 120 is available) to 1xRTT E911 caller 910. If 1xRTT network 120 is determined to not be available, 1xRTT availability determiner 905 may provide an indication 955 (e.g., that 1xRTT network 120 is not available) to eHRPD E911 caller 915.

1xRTT E911 caller 910 may include hardware or a combination of hardware and software that may receive indication 950 that 1xRTT network 120 is available, and may attempt the E911 call over 1xRTT network 120 (e.g., a home 1xRTT network associated with UE 110), as indicated by reference number 960. If the home 1xRTT network is not available, 1xRTT E911 caller 910 may attempt to place the E911 call in a roaming partner's 1xRTT network or in a 1xRTT network that is not affiliated with UE 110 (e.g., where UE 110 does not have a roaming agreement to the unaffiliated 1xRTT network). As further shown in FIG. 9, 1xRTT E911 caller 910 may provide E911 call 960 to status determiner 920. When the E911 call is connected over 1xRTT network 120 (e.g., a traffic channel is established to PSAP 610), if UE 110 was registered to IMS network 140 then UE 110 may send a domain notification SMS message over 1xRTT network 120 indicating that UE 110 is attached to 1xRTT network 120 to receive UE 110 terminated activities. After sending the domain notification SMS message, UE 110 may clear the IMS registration state locally, so that IMS re-registration may not be triggered while the E911 call is occurring over 1xRTT network 120.

eHRPD E911 caller 915 may include hardware or a combination of hardware and software that may receive indication 955 that 1xRTT network 120 is not available, may attempt the E911 call over eHRPD network 130 (e.g., when UE 110 is IMS registered 935), as indicated by reference number 965, and the E911 call may be connected to PSAP 610. In one implementation, if UE 110 is not IMS registered 935, the E911 call may be continuously attempted over 1xRTT network 120. After the E911 call is complete (e.g., ended or dropped) over eHRPD network 130, eHRPD 911 caller 915 may provide an indication 970 (e.g., that the E911 call is complete) to ECM component 925, and UE 110 may enter an emergency callback mode (ECM) without sending a domain notification SMS message. In the ECM, UE 110 may remain in eHRPD network 130 for five minutes (or some other time period) in order to be ready to receive callback from a PSAP.

In one exemplary implementation, if IMS network 140 re-registration is triggered while the E911 call is being tried over 1xRTT network 130, it may not be possible for the re-register message to reach IMS network 140 since eHRPD network 130 may be inactive and UE 110 may drop the re-register message. An IMS network 140 re-registration retry duration may be between two to three minutes. After that duration, the re-registration may be declared a failure. During the IMS re-registration retry duration (e.g., where UE 110 may still be considered to be registered with IMS network 140), if UE 110 switches from 1xRTT network 120 to eHRPD network 130 to retry the E911 call over IMS network 140, the IMS re-registration message and a SIP invite message can be sent independently to complete the E911 call and IMS re-registration. Supplementary services (e.g., SMS services) may be disallowed on UE 110 during the E911 call.

Status determiner 920 may include hardware or a combination of hardware and software that may receive a status 975 of the E911 call over 1xRTT network 120 (e.g., whether the E911 call is connected over 1xRTT network 120, whether the E911 call is complete, etc.). If the E911 call fails to connect over 1xRTT network 120, status determiner 920 may provide an indication 985 (e.g., that the E911 call is not connected to 1xRTT network 120) to eHRPD E911 caller 915, and eHRPD E911 caller 915 may attempt the E911 call as described above. After the E911 call is complete (e.g., ended or dropped) over 1xRTT network 120, status determiner 920 may provide an indication 980 (e.g., that the E911 call is complete) to ECM component 925, and UE 110 may enter the ECM. In the ECM, UE 110 may remain in 1xRTT network 120 for five minutes (or some other time period) in order to be ready to receive callback from a PSAP.

ECM component 925 may include hardware or a combination of hardware and software that may receive indication 970 or 980 (e.g., indicating that the E911 call is complete) from eHRPD E911 caller 915 or status determiner 920, respectively. ECM component 925 may maintain UE 110 in 1xRTT network 120 or eHRPD network 130 for five minutes (or some other time period) in order to be ready to receive callback from a PSAP. ECM component 925 may maintain UE 110 in the ECM for the time period or until a user initiates an outgoing voice call via UE 110. Further details of ECM component 925 are provided below in connection with, for example, FIG. 10.

Although FIG. 9 shows exemplary functional components of UE 110, in other implementations, UE 110 may contain fewer, different, differently arranged, or additional functional components than depicted in FIG. 9. In still other implementations, one or more functional components of UE 110 may perform one or more other tasks described as being performed by one or more other functional components of UE 110.

Figure 10:
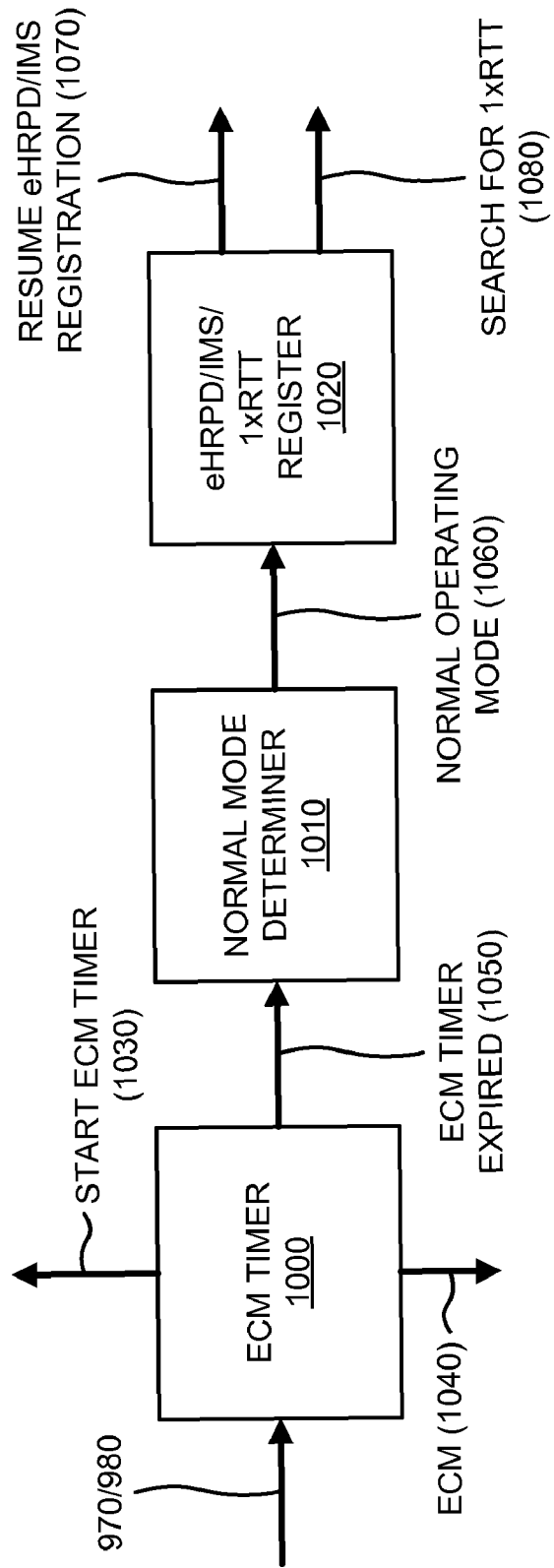
FIG. 10 illustrates a diagram of exemplary functional components of an emergency callback mode (ECM) component of the user equipment depicted in FIG. 9.

FIG. 10 illustrates a diagram of exemplary functional components of ECM component 925. In one implementation, the functions described in connection with FIG. 10 may be performed by one or more of the components of UE 110, as depicted in FIG. 8. As shown in FIG. 10, ECM component 925 may include an ECM timer 1000, a normal mode determiner 1010, and an eHRPD/IMS/1xRTT register 1020.

After an E911 call completes over 1xRTT network 120, UE 110 may return to a normal system selection mode. UE 110 could have been on any system during the E911 call so there may be a delay to return to eHRPD network 130 (e.g., about four to six seconds). When UE 110 actively searches for eHRPD network 130 (e.g., to resume an eHRPD session), UE 110 may not be monitoring a paging channel of UE 110 and may miss a page which may be a PSAP callback. To avoid missing a PSAP callback, ECM component 925 may implement the ECM. For similar reasons, ECM component 925 may also implement the ECM after an E911 call completes over eHRPD network 130.

ECM timer 1000 may include hardware or a combination of hardware and software that may receive indication 970 or 980 (e.g., indicating that the E911 call is complete), and may start an ECM timer (e.g., a timer that may last a particular time period, such as five minutes), as indicated by reference number 1030. ECM timer 1000 may maintain UE 110 in an emergency callback mode (ECM) 1040 until the ECM timer expires or until a user instigates ECM exit (e.g., via UE 110). When the ECM timer expires, ECM timer 1000 may provide an indication 1050 (e.g., that the ECM timer expired) to normal mode determiner 1010.

Normal mode determiner 1010 may include hardware or a combination of hardware and software that may receive indication 1050 (e.g., that the ECM timer expired) from ECM timer 1000, and may instruct UE 110 to return to a normal operating mode (e.g., a non-emergency callback mode), as indicated by reference number 1060.

eHRPD/IMS/1xRTT register 1020 may include hardware or a combination of hardware and software that may receive instructions 1060 (e.g., to return to a normal operating mode) from normal mode determiner 1010. In response to instructions 1060, eHRPD/IMS/1xRTT register 1020 may resume connection with eHRPD network 130 and may perform a registration with IMS network 140, as indicated by reference number 1070. Alternatively and/or additionally, in response to instructions 1060, eHRPD/IMS/1xRTT register 1020 may search for 1xRTT network 120, as indicated by reference number 1080.

Although FIG. 10 shows exemplary functional components of ECM component 925, in other implementations, ECM component 925 may contain fewer, different, differently arranged, or additional functional components than depicted in FIG. 10. In still other implementations, one or more functional components of ECM component 925 may perform one or more other tasks described as being performed by one or more other functional components of ECM component 925.

FIGS. 11-22 depict exemplary diagrams of call flows among exemplary portions of the network 100 and according to implementations described herein. As shown in FIG. 11, an exemplary network portion 1100 may include UE 110, HSGW/PGW 310/320, P-CSCF 420, I-CSCF 400, S-CSCF 410, MSC 220, HLR 230, MPC/PDE 235/240, SR 600, ALI 620, and PSAP 610. UE 110, HSGW/PGW 310/320, P-CSCF 420, I-CSCF 400, S-CSCF 410, MSC 220, HLR 230, MPC/PDE 235/240, SR 600, ALI 620, and PSAP 610 may include the features described above in connection with, for example, FIGS. 1-10. Exemplary network portion 1100 may perform the call flow depicted in FIG. 11 when UE 110 switches from eHRPD network 130 to 1xRTT network 120 and makes an E911 call over 1xRTT network 120.

As further shown in FIG. 11, UE 110 may be dual register capable, may be registered with 1xRTT network 120, eHRPD network 130, and IMS network 140, and may be connected to eHRPD network 130 when the E911 call is initiated (block 1105). A user of UE 110 may dial "911," UE 110 may detect that the E911 call is to be made, and UE 110 may make a cell reselection from eHRPD network 130 to 1xRTT network 120 (block 1110). UE 110 may not need to register with 1xRTT network 120 before it sends an emergency setup message to start the E911 call. UE 110 may include a channel in 1xRTT network 120 and may send an emergency setup message to start the E911 call, and MSC 220 may receive the emergency setup message (block 1115). MSC 220 may request location information from MPC/PDE 235/240 by passing cell identity and mobile information (e.g., via an OREQ request message) (block 1120). MPC/PDE 235/240 may use the cell identity to determine an emergency service routing key (ESRK) and may return the ESRK to MSC 220 (e.g., via an ORREQ response message) (block 1125). At the same time, MPC 235 may begin a location determination process, and PDE 240 may calculate UE's 110 accurate location and may provide UE's 110 location to MPC 235 (block 1130).

MSC 220 may send the emergency setup and the ESRK to SR 600, and SR 600 may forward the E911 call to PSAP 610 (block 1135). The E911 call may be established between UE 110 and PSAP 610 as a 1xRTT E911 call (block 1140). While in the E911 call, UE 110 may send a domain notification SMS message to indicate that UE 110 is connected to 1xRTT network 120 (block 1145). PSAP 610 may send a location request to ALI 620 to request UE's 110 initial location, and ALI 620 may provide the location request to MPC 235 (block 1150). MPC 235 may return location information and a callback number (e.g., associated with UE 110) to PSAP 610 (block 1155). UE 110 may start the ECM timer which expires after a particular time (e.g., five minutes), and may be ready to receive a callback from PSAP 610 via 1xRTT network 120 (block 1160). The callback from PSAP 610 may be received in 1xRTT network 120 if the callback is received within the particular time after the E911 call is released.

As shown in FIGS. 12A and 12B, an exemplary network portion 1200 may include UE 110, HSGW/PGW 310/320, PCRF 330, HSS 340, P-CSCF 420, S-CSCF 410, E-CSCF 440, NNI-SBC 450, SBC 500, ECS 520, MGW 530, and PSAP 610. UE 110, HSGW/PGW 310/320, PCRF 330, HSS 340, P-CSCF 420, S-CSCF 410, E-CSCF 440, NNI-SBC 450, SBC 500, ECS 520, MGW 530, and PSAP 610 may include the features described above in connection with, for example, FIGS. 1-11. Exemplary network portion 1200 may perform the call flow depicted in FIGS. 12A and 12B when UE 110 determines that 1xRTT network 120 is not available and makes an IMS VoIP E911 call over eHRPD network 130 and via peering network 150.

As shown in FIG. 12A, UE 110 may be dual register capable, may be registered with 1xRTT network 120, eHRPD network 130, and IMS network 140, and may be connected to eHRPD network 130 (block 1202). A user of UE 110 may dial "911," and UE 110 may detect that an E911 call is to be made, may determine that 1xRTT network 120 is not available, and may begin an IMS VoIP E911 call over eHRPD network 130 (block 1204). UE 110 may send a SIP invite request that includes 911 in a uniform resource identifier (URI) and a cell location of UE 110 (block 1206). P-CSCF 420 may detect an emergency call setup based on the SIP invite request and may send the SIP invite request to E-CSCF (block 1208). E-CSCF 440 may receive the SIP invite request and may invoke NNI-SBC 450 for the E911 call (block 1210). NNI-SBC 450 may recognize 911 calls and may send the SIP invite request and caller information to SBC 500 (block 1212). SBC 500 may send the SIP invite message to ECS 520 (block 1214).

As further shown in FIG. 12A, peering network 150 may determine routing information based upon cell identity and may provide a SIP 300 multiple choices (MC) response (e.g., that includes an emergency services routing number (ESRN) and ESRK) to SBC 500 (block 1216). SBC 500 may acknowledge the 300 MC response (block 1218), and may provide a SIP invite message (e.g., that includes the ESRN and ESRK) through peering network 150 to MGW 530 (block 1220). MGW 530 may perform call set up to PSAP 610 (block 1222) and PSAP 610 may receive the ESRK and respond to MGW 530 (block 1224). MGW 520 may initiate a SIP 183 session progress message and may send the message to SBC 500 (block 1226). SBC 500 may send the session progress message to NNI-SBC 450 (block 1228), and NNI-SBC 450 may route the session progress message to E-CSCF 440 (block 1230). E-CSCF 440 may route the session progress message to P-CSCF 420 (block 1232), and P-CSCF 420 may request PGW 320 to open gates for a ring back tone and may send the session progress message to UE 110 (block 1234).

As still further shown in FIG. 12A, UE 110 may generate an acknowledgement (e.g., a PRACK) to acknowledge receipt of the session progress message and may provide the PRACK to P-CSCF 420 (block 1236). P-CSCF 420 may provide the PRACK to E-CSCF 440 (block 1238), and E-CSCF 440 may provide the PRACK to NNI-SBC 450 (block 1240). NNI-SBC 450 may provide the PRACK to SBC 500 (block 1242), and SBC 500 may provide the PRACK to MGW 530 (block 1244). MGW 530 may generate a 200 OK message and may provide the OK message to SBC 500 (block 1246). SBC 500 may provide the OK message to NNI-SBC 450 (block 1248), and NNI-SBC 450 may provide the OK message to E-CSCF 440 (block 1250). E-CSCF 440 may provide the OK message to P-CSCF 420 (block 1252), and P-CSCF 420 may provide the OK message to UE 110 (block 1254).

As shown in FIG. 12B, PSAP 610 may answer the E911 call via MGW 530 (block 1256). MGW 530 may generate a 200 OK message and may provide the OK message to SBC 500 (block 1258). SBC 500 may provide the OK message to NNI-SBC 450 (block 1260), and NNI-SBC 450 may provide the OK message to E-CSCF 440 (block 1262). E-CSCF 440 may provide the OK message to P-CSCF 420 (block 1264), and P-CSCF 420 may send the OK message to UE 110 (block 1266). The OK message may inform UE 110 that the E911 call has been answered. At this point, a voice path may be established between UE 110 and PSAP 610 (block 1268). UE 110 may provide an acknowledgement (e.g., an ACK) to P-CSCF 420 (block 1270), and P-CSCF 420 may provide the ACK to E-CSCF 440 (block 1272). E-CSCF 440 may provide the ACK to NNI-SBC 450 (block 1274), and NNI-SBC 450 may send the ACK to SBC 500 (block 1276). PSAP 610 may request (e.g., using an ESPOSREQ message) emergency call information from ECS 520 (block 1278), and ECS 520 may provide a callback number and location information to PSAP 610 (block 1280).

Figure 13A:
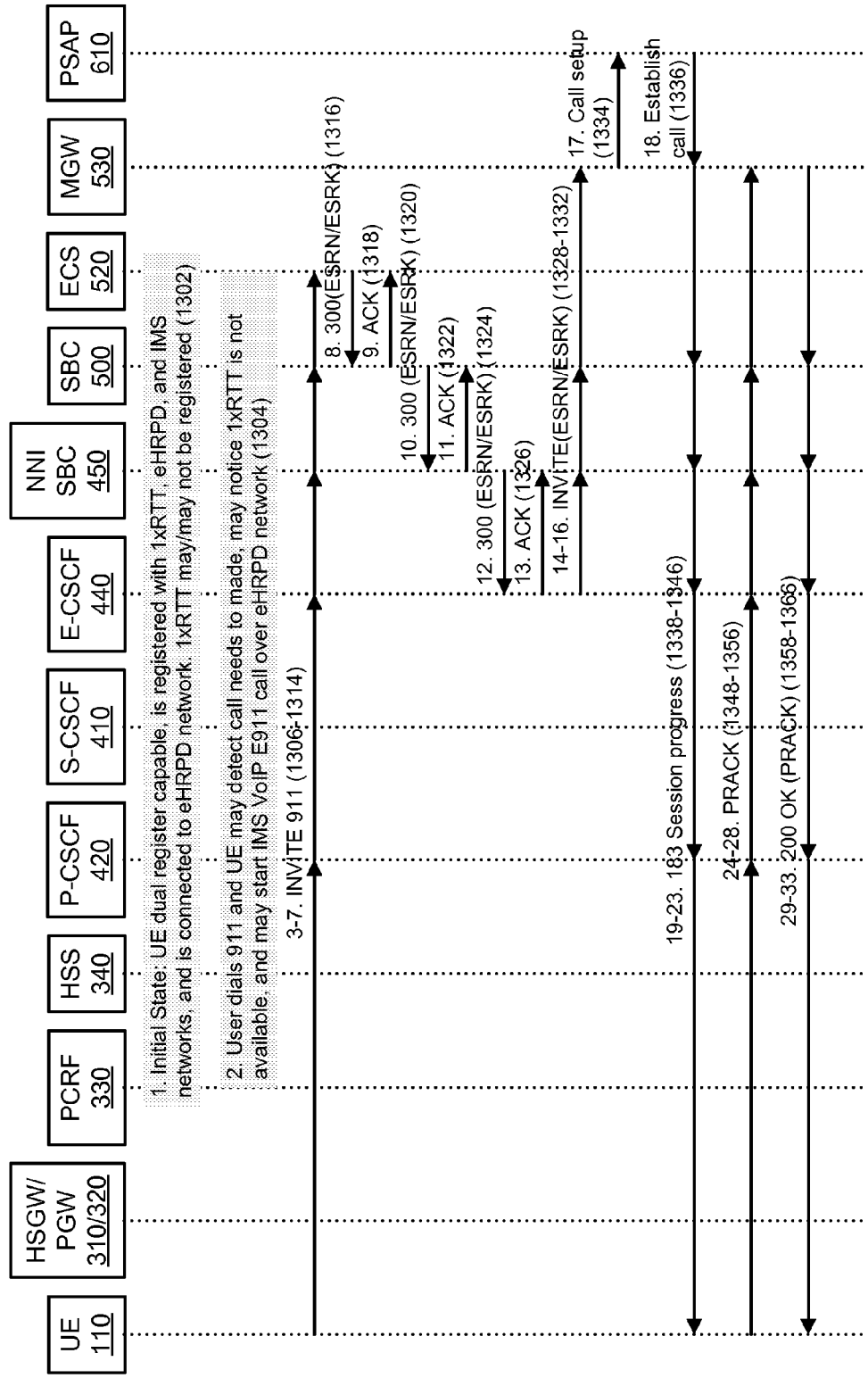

As shown in FIGS. 13A and 13B, an exemplary network portion 1300 may include UE 110, HSGW/PGW 310/320, PCRF 330, HSS 340, P-CSCF 420, S-CSCF 410, E-CSCF 440, NNI-SBC 450, SBC 500, ECS 520, MGW 530, and PSAP 610. UE 110, HSGW/PGW 310/320, PCRF 330, HSS 340, P-CSCF 420, S-CSCF 410, E-CSCF 440, NNI-SBC 450, SBC 500, ECS 520, MGW 530, and PSAP 610 may include the features described above in connection with, for example, FIGS. 1-12B. Exemplary network portion 1300 may perform the call flow depicted in FIGS. 13A and 13B when UE 110 determines that 1xRTT network 120 is not available and makes an IMS VoIP E911 call over eHRPD network 130. In contrast to FIGS. 12A and 12B, the IMS VoIP E911 call depicted in FIGS. 13A and 13B may be routed through one or more devices of IMS network 140 and/or peering network 150.

As shown in FIG. 13A, UE 110 may be dual register capable, may be registered with 1xRTT network 120, eHRPD network 130, and IMS network 140, and may be connected to eHRPD network 130 (block 1302). A user of UE 110 may dial "911," and UE 110 may detect that an E911 call is to be made, may determine that 1xRTT network 120 is not available, and may begin an IMS VoIP E911 call over eHRPD network 130 (block 1304). UE 110 may send a SIP invite request that includes 911 in a uniform resource identifier (URI) and a cell location of UE 110 (block 1306). P-CSCF 420 may detect an emergency call setup based on the INVITE request and may send the INVITE request to E-CSCF (block 1308). E-CSCF 440 may receive the INVITE request and may invoke NNI-SBC 450 for the E911 call (block 1310). NNI-SBC 450 may recognize 911 calls and may send the SIP invite request and caller information to SBC 500 (block 1312). SBC 500 may send the invite message to ECS 520 (block 1314).

As further shown in FIG. 13A, peering network 150 may determine routing information based upon cell identity and may provide a SIP 300 MC response (e.g., that includes an ESRN and ESRK) to SBC 500 (block 1316). SBC 500 may acknowledge the 300 MC response (block 1318), and may provide the SIP 300 MC message to NNI-SBC 450 (block 1320). NNI-SBC 450 may acknowledge the SIP 300 MC message (block 1322), and may forward a SIP 300 MC response to E-CSCF 440 (block 1324). E-CSCF 440 may acknowledge the SIP 300 MC response (block 1326). E-CSCF 440 may examine the ESRN received in the SIP 300 MC response and may determines if the emergency call is to be routed through a peering network associated with IMS network 140 or through peering network 150. In this example, E-CSCF 440 may determine that the emergency call is to be routed through peering network, and may send a SIP invite message (e.g., that includes ESRN and ESRK) to NNI-SBC 450 (block 1328). NNI-SBC 450 may forward the SIP invite message to SBC 500 (block 1330), and SBC 500 may examine the SIP invite message and may send the SIP invite message through peering network 150 to MGW 530 (block 1332).

MGW 530 may perform call set-up to PSAP 610 (block 1334), and PSAP 610 may receive the ESRK and may establish the call by responding to MGW 530 (block 1336). MGW 530 may send a SIP 183 session progress message to SBC 500 (block 1338), and SBC 500 may provide the SIP 183 session progress message to NNI-SBC 450 (block 1340). NNI-SBC 450 may route the SIP 183 session progress message to E-CSCF 440 (block 1342), and E-CSCF 440 may route the SIP 183 session progress message to P-CSCF 420 (block 1344). P-CSCF 420 may initiate a request (e.g., to PGW 320) to open gates for a ring back tone and may send the SIP 183 session progress message to UE 110 (block 1346). UE 110 may provide an acknowledgement (e.g., a PRACK to acknowledge receipt of the SIP 183 session progress message) to P-CSCF 420 (block 1348), and P-CSCF 420 may provide the PRACK to E-CSCF 440 (block 1350). E-CSCF 440 may provide the PRACK to NNI-SBC 450 (block 1352), and NNI-SBC 450 may provide the PRACK to SBC 500 (block 1354). SBC 500 may provide the PRACK to MGW 530 (block 1356).

MGW 530 may generate and provide a SIP 200 OK message to SBC 500 (block 1358), and SBC 500 may provide the SIP 200 OK message to NNI-SBC 450 (block 1360). NNI-SBC 450 may provide the SIP 200 OK message to E-CSCF 440 (block 1362), and E-CSCF 440 may provide the SIP 200 OK message to P-CSCF 420 (block 1364). P-CSCF 420 may provide an updated media description to PCRF 330, PGW 320 may update traffic flow filters, and P-CSCF 420 may provide the SIP 200 OK message to UE 110 (block 1366).

As shown in FIG. 13B, PSAP 610 may answer the emergency call via MGW 530 (block 1368), and MGW 530 may provide a SIP 200 OK message to SBC 500 (block 1370). At this point, a voice path may be established between UE 110 and PSAP 610 (block 1380). SBC 500 may provide the SIP 200 OK message to NNI-SBC 450 (block 1372), and NNI-SBC 450 may provide the SIP 200 OK message to E-CSCF 440 (block 1374). E-CSCF 440 may provide the SIP 200 OK message to P-CSCF 420 (block 1376), and P-CSCF 420 may send the SIP 200 OK message to UE 110 (block 1378). UE 110 may provide an acknowledgement (ACK) message to P-CSCF 420 (block 1382), and P-CSCF 420 may send the ACK message to E-CSCF 440 (block 1384). E-CSCF 440 may send the ACK message to NNI-SBC 450 (block 1386), and NNI-SBC 450 may provide the ACK message to SBC 500 (block 1388). PSAP 610 may request emergency call information from ECS 520 (e.g., using an ESPOSREQ message that includes the ESRK) (block 1390), and ECS 520 may return the callback number and location information (e.g., for UE 110) to PSAP 610 (block 1392). Location information may be based on a cell identity that UE 110 provides in a SIP invite message to ECS 520. Based on the cell identity, ECS 520 may define a correct PSAP and the emergency call may be routed to PSAP 610.

As shown in FIG. 14, an exemplary network portion 1400 may include UE 110, HSGW/PGW 310/320, PCRF 330, HSS 340, P-CSCF 420, S-CSCF 410, E-CSCF 440, NNI-SBC 450, SBC 500, ECS 520, MGW 530, and PSAP 610. UE 110, HSGW/PGW 310/320, PCRF 330, HSS 340, P-CSCF 420, S-CSCF 410, E-CSCF 440, NNI-SBC 450, SBC 500, ECS 520, MGW 530, and PSAP 610 may include the features described above in connection with, for example, FIGS. 1-13B. Exemplary network portion 1400 may perform the call flow depicted in FIG. 14 when UE 110 switches from eHRPD network 130 to 1xRTT network 120, starts an E911 call, loses coverage in 1xRTT network 120 during the E911 call, and redials the E911 call.

As further shown in FIG. 14, UE 110 may be dual register capable, may be registered with 1xRTT network 120, eHRPD network 130, and IMS network 140, and may be connected to eHRPD network 130 (block 1410). A user of UE 110 may dial "911," and UE 110 may detect that an E911 call is to be made, and may make a cell reselection from eHRPD network 130 to 1xRTT network 120 (block 1420). UE 110 may not need to register with 1xRTT network 120 before UE 110 sends an emergency setup to start the E911 call. During the E911 call over 1xRTT network 120, UE 110 may lose coverage to 1xRTT network 120 (block 1430), an indication that the E911 call is dropped may be provided to the user of UE 110 and the user (e.g., via UE 110) may redial "911" (block 1440). The redialed E911 call may be completed as set forth above with respect to one or more of FIGS. 12A-13B (e.g., the redialed E911 call may be attempted over 1xRTT network 120, and, if unsuccessful, the redialed E911 call may be attempted over eHRPD network 130 and IMS network 140) (block 1450).

As shown in FIG. 15, an exemplary network portion 1500 may include UE 110, 1xRTT network 120, and IMS network 140. UE 110, 1xRTT network 120, and IMS network 140 may include the features described above in connection with, for example, FIGS. 1-14.

As further shown in FIG. 15, UE 110 may be conducting an IMS VoIP call (e.g., via eHRPD network 130 (not shown) and IMS network 140) (block 1510), and, at the same time, a user of UE 110 may initiate an E911 call (block 1520). UE 110 may release the IMS VoIP call (e.g., by sending a Bye message) (block 1530), and may use a local timer so that UE 110 does not indefinitely wait for a Bye response message (or UE 110 may proceed without waiting for the Bye response message) (block 1540). When UE 110 receives the Bye response message (or when the local timer expires), UE 110 may make a cell reselection to 1xRTT network 120 and may begin the E911 call as set forth above with respect to FIG. 11 (block 1550).

A number of errors may occur in network 100 (FIG. 1) when attempting to connect an emergency call (e.g., from UE 110) and/or during the emergency call. The following paragraphs discuss some exemplary errors that may occur in network 100 and how such errors may be handled. However, the following sections are not intended to disclose all errors (e.g., and how they are handled) that may occur in network 100.

In one error example, UE 110 may connect to P-CSCF 420 (e.g., when attempting to place an E911 call) but may not receive a response from P-CSCF 420. UE 110 may handle such a scenario by switching back to 1xRTT network 120 and by attempting to connect the E911 call over 1xRTT network 120. In another error example, P-CSCF 420 (e.g., when an E911 call is attempted by UE 110) may connect to E-CSCF 440 but may not receive a response from E-CSCF 440. In response to such an error, since each P-CSCF 420 may be collocated with an E-CSCF 440 (e.g., IMS network 140 may include collocated CSCF clusters (i.e., I-CSCF 400, S-CSCF 410, P-CSCF 420, and E-CSCF 440), UE 110 may connect to any of the available CSCFs to establish the E911 call. UE 110 may receive the CSCF addresses from PDN-GW 320 during attachment to eHRPD network 130.

In still another error example, primary NNI-SBC 450 may not respond during an E911 call. For example, UE 110 may be dual register capable, may be registered with 1xRTT network 120, eHRPD network 130, and IMS network 140, and may be connected to eHRPD network 130. When UE 110 places the E911 call, UE 110 may send a SIP invite request (e.g., that includes 911 in the request-URI and a cell location of UE 110) to P-CSCF 420. P-CSCF 420 may detect an emergency call setup and may send a SIP 911 invite request to E-CSCF 440. E-CSCF 440 may invoke primary NNI-SBC 450 for the E911 call, but NNI-SBC 450 may time out. E-CSCF 440 may then route the SIP 911 invite request to secondary NNI-SBC 460, and secondary NNI-SBC 460 may send the SIP 911 invite request to secondary SBC 510. From this point, the E911 call may be routed as set forth above in connection with one or more of FIGS. 11-15.

Two exception scenarios may exist for processing of an IMS-based emergency call. The first exception scenario, referred to as a single error scenario, may occur when NNI-SBC 450 attempts to send a SIP invite to SBC 500 and SBC 500 returns an error. The second exception scenario, referred to as a double error scenario, may occur when NNI-SBC 450 retries sending the SIP invite to a different location (e.g., secondary SBC 510) and secondary SBC 510 returns an error again.

The single error scenario may occur if SBC 500 does not receive a response from ECS 520 or if ECS 520 could not determine an ESRN or ESRK for the emergency call (e.g., due to system problems). For example, UE 110 may be dual register capable, may be registered with 1xRTT network 120, eHRPD network 130, and IMS network 140, and may be connected to eHRPD network 130. When UE 110 places the E911 call, UE 110 may send a SIP invite request (e.g., that includes 911 in the request-URI and a cell location of UE 110) to P-CSCF 420. P-CSCF 420 may detect an emergency call setup and may send a SIP 911 invite request to E-CSCF 440. E-CSCF 440 may invoke primary NNI-SBC 450 for the E911 call. Primary NNI-SBC 450 may provide the SIP 911 invite request to primary SBC 500, and primary SBC 500 may return an error (e.g., due to a system failure) to primary NNI-SBC 450. Primary NNI-SBC 450 may forward the error to E-CSCF 440, and E-CSCF 440 may send a SIP invite message to secondary NNI-SBC 460. Secondary NNI-SBC 460 may provide the SIP invite message to secondary SBC 510, and secondary SBC 510 may send the SIP invite message to ECS 520. From this point, the E911 call may be routed as set forth above in connection with one or more of FIGS. 11-15.

The double error scenario may occur if primary SBC 500 does not receive a response from ECS 520 or can not determine an ESRN or ESRK for the emergency call (e.g., due to system problems). For example, UE 110 may be dual register capable, may be registered with 1xRTT network 120, eHRPD network 130, and IMS network 140, and may be connected to eHRPD network 130. When UE 110 places the E911 call, UE 110 may send a SIP invite request (e.g., that includes 911 in the request-URI and a cell location of UE 110) to P-CSCF 420. P-CSCF 420 may detect an emergency call setup and may send a SIP 911 invite request to E-CSCF 440. E-CSCF 440 may invoke primary NNI-SBC 450 for the E911 call. Primary NNI-SBC 450 may provide the SIP 911 invite request to primary SBC 500, and primary SBC 500 may return an error (e.g., due to a system failure) to primary NNI-SBC 450. Primary NNI-SBC 450 may forward the error to E-CSCF 440, and E-CSCF 440 may send a SIP invite message to secondary NNI-SBC 460. Secondary NNI-SBC 460 may forward the SIP invite message to secondary SBC 510, and secondary SBC 510 may return an error. Secondary NNI-SBC 460 may forward the error to E-CSCF 440, and E-CSCF 440 may determine the PSAP and may send the SIP invite message to MGW 530 (or to ECRC 550 if MGW 530 returns an error). From this point, the E911 call may be routed as set forth above in connection with one or more of FIGS. 11-15.

In another error example, IMS network 140 may periodically send a message (e.g., an options message) to primary SBC 500 to ensure that primary SBC 500 and/or peering network 150 are functioning. If IMS network 140 detects that SBC 500 is not available the following call flow may be executed. For example, UE 110 may be dual register capable, may be registered with 1xRTT network 120, eHRPD network 130, and IMS network 140, and may be connected to eHRPD network 130. When UE 110 places an E911 call, UE 110 may send a SIP invite request (e.g., that includes 911 in the request-URI and a cell location of UE 110) to P-CSCF 420. P-CSCF 420 may detect an emergency call setup and may send a SIP 911 invite request to E-CSCF 440. E-CSCF 440 may invoke primary NNI-SBC 450 for the E911 call. Primary NNI-SBC 450 may know that primary SBC 500 is out of service (e.g., due to options message), and may thus provide the SIP 911 invite request to secondary SBC 510. Secondary SBC 510 may forward the SIP 911 invite request to ECS 520. From this point, the E911 call may be routed as set forth above in connection with one or more of FIGS. 11-15.

Figure 16:
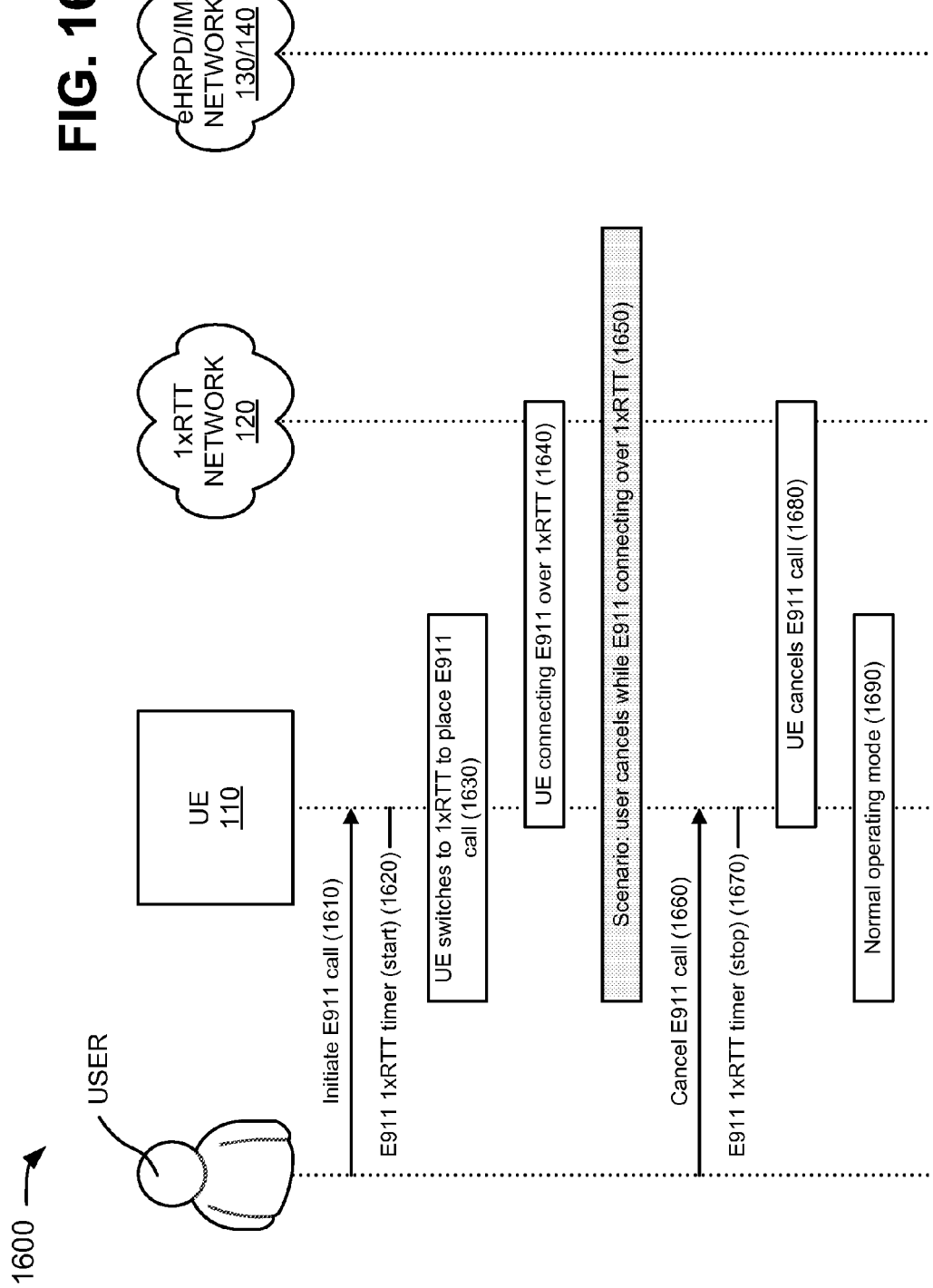

As shown in FIG. 16, an exemplary network portion 1600 may include a user, UE 110, 1xRTT network 120, eHRPD network 130, and IMS network 140. UE 110, 1xRTT network 120, eHRPD network 130, and IMS network 140 may include the features described above in connection with, for example, FIGS. 1-15. In one exemplary implementation, FIG. 16 may depict a call flow where a user cancels an E911 call while the E911 call is connecting over 1xRTT network 120.

As further shown in FIG. 16, the user may initiate the E911 call via UE 110 (e.g., which is connected to eHRPD network 130 and is registered with 1xRTT network 120 and IMS network 140) (block 1610), and UE 110 may start an E911 1xRTT timer (block 1620). UE 110 may switch to 1xRTT network 120 to place the E911 call (block 1630), and may connect the E911 call over 1xRTT network 120 (block 1640). The user may cancel the E911 call while the E911 call is connecting over 1xRTT network 120 (blocks 1650 and 1660), and UE 110 may stop the E911 1xRTT timer (block 1670). UE 110 may cancel the E911 call (block 1680) and may return to a normal operating mode (block 1690).

Figure 17:
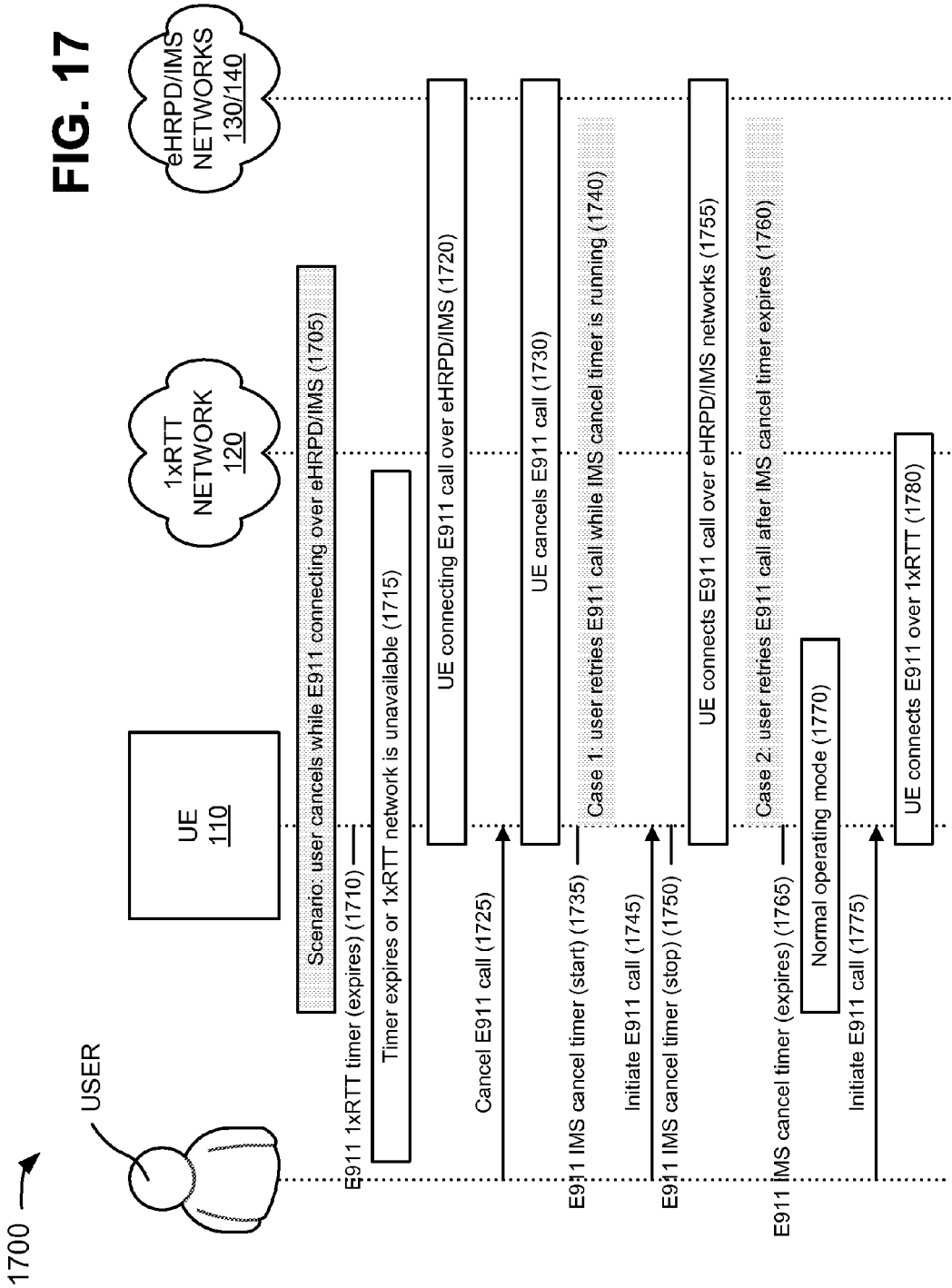

As shown in FIG. 17, an exemplary network portion 1700 may include a user, UE 110, 1xRTT network 120, eHRPD network 130, and IMS network 140. UE 110, 1xRTT network 120, eHRPD network 130, and IMS network 140 may include the features described above in connection with, for example, FIGS. 1-16. In one exemplary implementation, FIG. 17 may depict a call flow where a user cancels an E911 call while the E911 call is connecting over eHRPD network 130 and IMS network 140 (block 1705).

As further shown in FIG. 17, an E911 1xRTT timer may expire or 1xRTT network may be unavailable (blocks 1710 and 1715), and UE 110 may connect the E911 call over eHRPD network 130 and IMS network 140 (block 1720). The user may cancel the E911 call while the E911 call is connecting over eHRPD network 130 and IMS network 140 (block 1725), and UE 110 may cancel the E911 call (block 1730) and may start an E911 IMS cancel timer (block 1735). The user may retry the E911 call while the E911 IMS cancel timer is running (blocks 1740 and 1745), and UE 110 may stop the E911 IMS cancel timer (block 1750). UE 110 may connect the E911 call over eHRPD network 130 and IMS network 140 (block 1755), and the user may retry the E911 call after the E911 IMS cancel timer expires (blocks 1760 and 1765). UE 110 may return to a normal operating mode (block 1770), the user may initiate the E911 call (e.g., via UE 110) (block 1775), and UE 110 may connect the E911 call over 1xRTT network 120 (block 1780).

Figure 18:
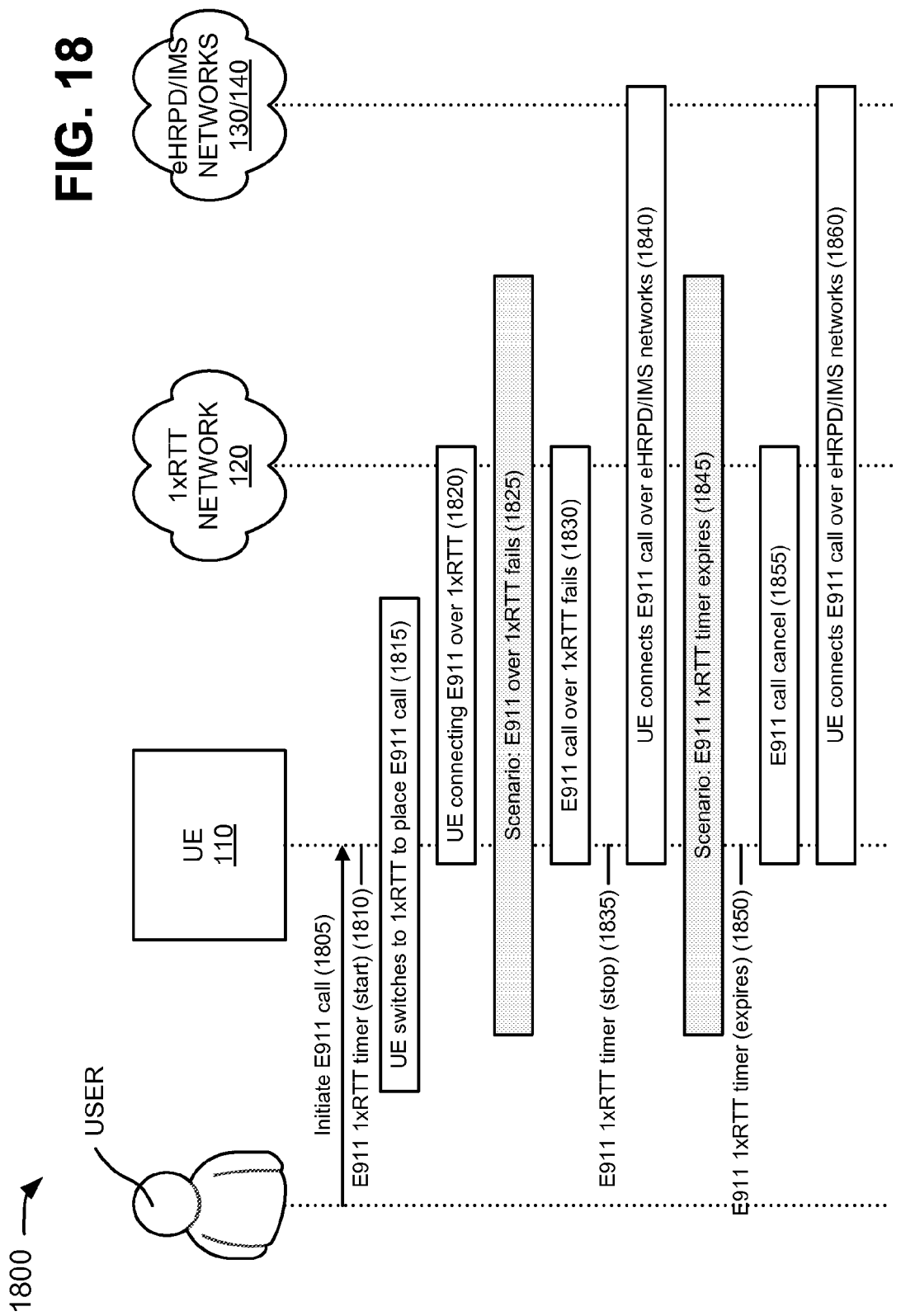

As shown in FIG. 18, an exemplary network portion 1800 may include a user, UE 110, 1xRTT network 120, eHRPD network 130, and IMS network 140. UE 110, 1xRTT network 120, eHRPD network 130, and IMS network 140 may include the features described above in connection with, for example, FIGS. 1-17. In one exemplary implementation, FIG. 18 may depict a call flow where an E911 call fails over 1xRTT network 120.

As further shown in FIG. 18, the user may initiate the E911 call via UE 110 (e.g., which is connected to eHRPD network 130 and is registered with 1xRTT network 120 and IMS network 140) (block 1805), and UE 110 may start an E911 1xRTT timer (block 1810). UE 110 may switch to 1xRTT network 120 to place the E911 call (block 1815), and may connect the E911 call over 1xRTT network 120 (block 1820). The E911 call over 1xRTT network 120 may fail (blocks 1825 and 1830), UE 110 may stop E911 1xRTT timer (block 1835), and UE 110 may connect the E911 call over eHRPD network 130 and IMS network 140 (block 1840). Alternatively, the E911 1xRTT timer may expire (blocks 1845 and 1850), UE 110 may cancel the E911 call over 1xRTT network 120 (block 1855), and UE 110 may connect the E911 call over eHRPD network 130 and IMS network 140 (block 1860).

Figure 19:
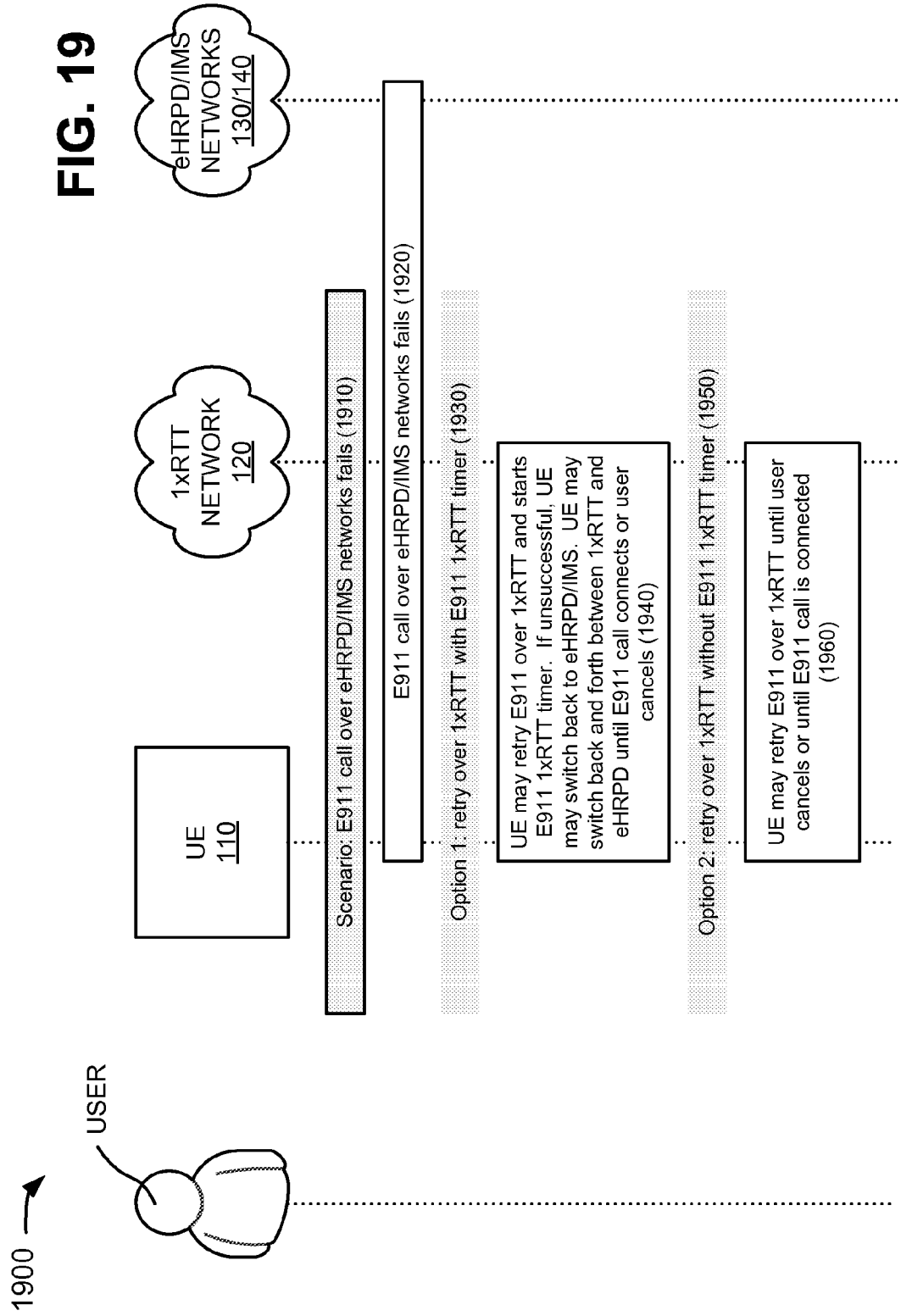

As shown in FIG. 19, an exemplary network portion 1900 may include a user, UE 110, 1xRTT network 120, eHRPD network 130, and IMS network 140. UE 110, 1xRTT network 120, eHRPD network 130, and IMS network 140 may include the features described above in connection with, for example, FIGS. 1-18. In one exemplary implementation, FIG. 19 may depict a call flow where an E911 call fails over eHRPD network 130 and IMS network 140.

As further shown in FIG. 19, an E911 call (e.g., by UE 110) over eHRPD network 130 and IMS network 140 may fail (blocks 1910 and 1920). In one exemplary implementation, UE 110 may retry the E911 call over 1xRTT network 120 and may start an E911 1xRTT timer (block 1930). If the retry of the E911 call is unsuccessful, UE 110 may switch back to eHRPD network 130 and IMS network 140 and may retry the E911 call via eHRPD/IMS networks 130/140. UE 110 may switch back and forth between 1xRTT network 120 and eHRPD network 130 until the E911 call connects or the user cancels (block 1940). In another exemplary implementation, UE 110 may retry the E911 call over 1xRTT network 120 (e.g., without the E911 1xRTT timer) (block 1950) until the user cancels or until the E911 call is connected (block 1960).

Figure 20:
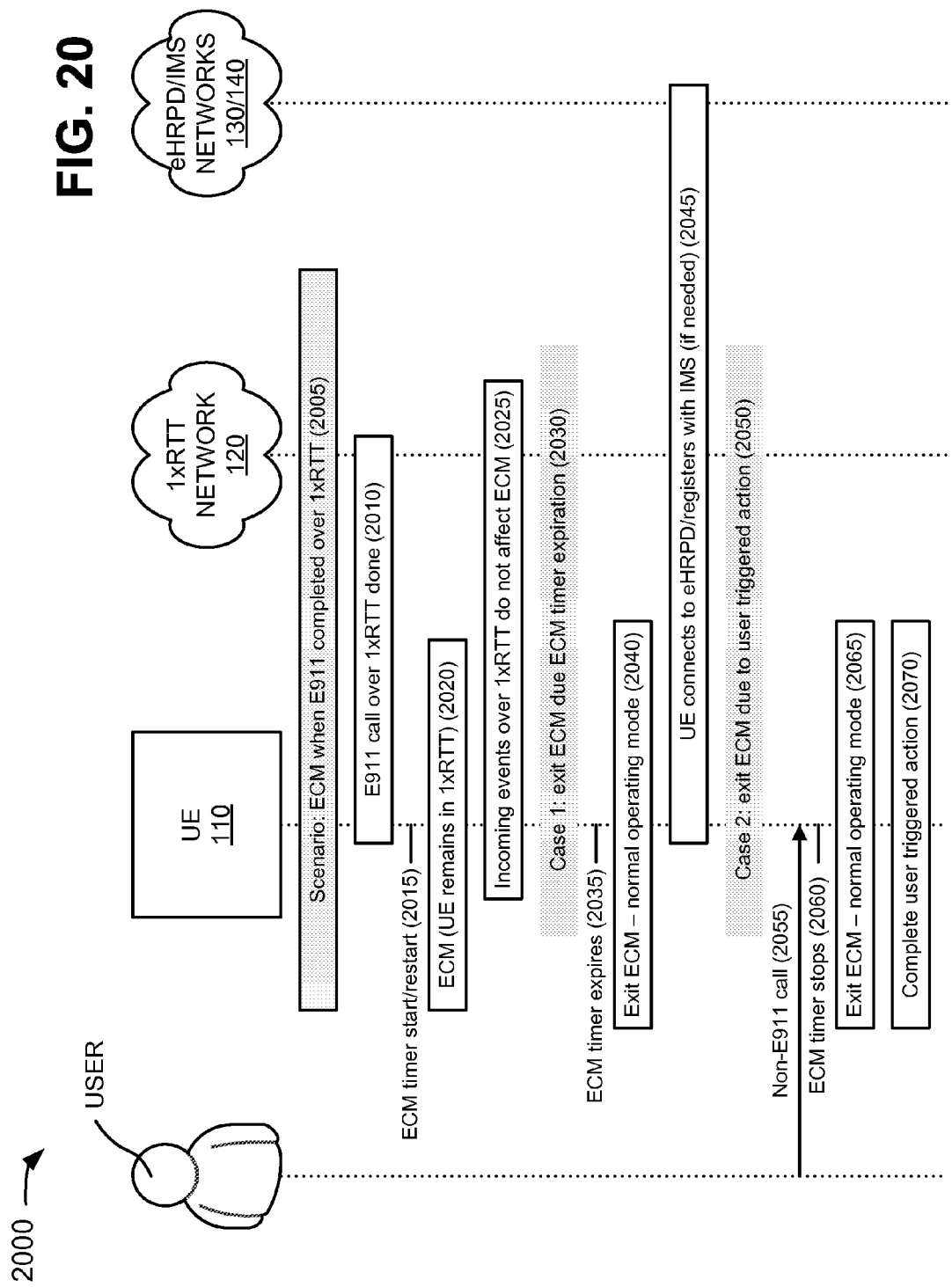

As shown in FIG. 20, an exemplary network portion 2000 may include a user, UE 110, 1xRTT network 120, eHRPD network 130, and IMS network 140. UE 110, 1xRTT network 120, eHRPD network 130, and IMS network 140 may include the features described above in connection with, for example, FIGS. 1-19. In one exemplary implementation, FIG. 20 may depict an emergency callback mode (ECM) after an E911 call is completed over 1xRTT network 120 (block 2005).

As further shown in FIG. 20, the E911 call (e.g., by UE 110) over 1xRTT network 120 may be complete (block 2010), and UE 110 may start (or restart) an ECM timer (block 2015). UE 110 may remain in the ECM and 1xRTT network 120 prior to expiration of the ECM timer (block 2020), and incoming events (e.g., calls) over 1xRTT network 120 (e.g., to UE 110) may not affect the ECM (block 2025). In one exemplary implementation, UE 110 may exit the ECM when the ECM timer expires (blocks 2030 and 2035), may return to a normal operating mode (block 2040), and may connect to eHRPD network 130 and register with IMS network 140 (if needed (block 2045). In another exemplary implementation, UE 110 may exit the ECM due to a user-triggered action, such as receipt of a non-E911 call (blocks 2050 and 2055). UE 110 may stop the ECM timer (block 2060), may exit the ECM, and may return to a normal operating mode (block 2065). UE 110 may then complete the user-triggered action (block 2070).

Figure 21:
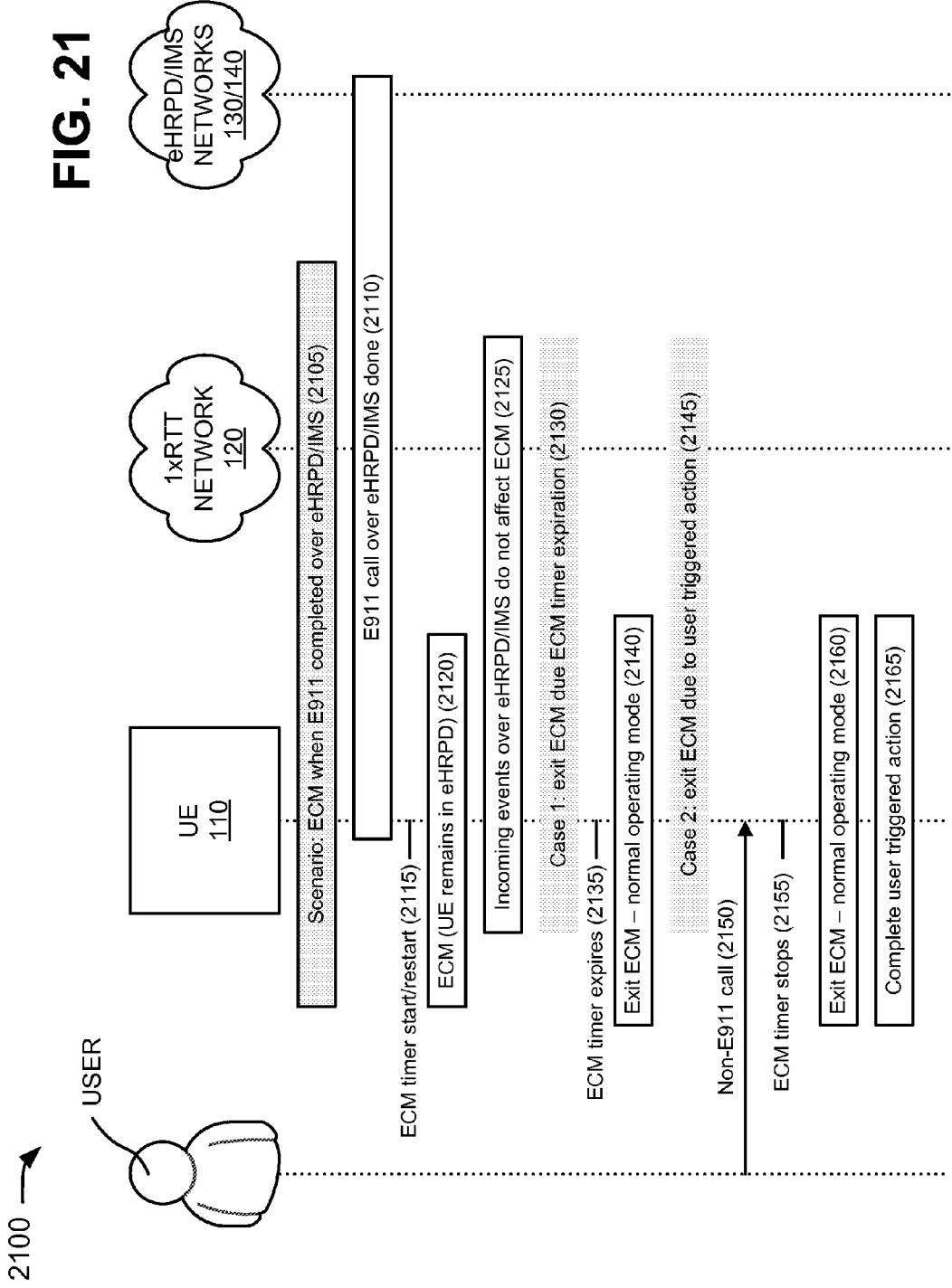

As shown in FIG. 21, an exemplary network portion 2100 may include a user, UE 110, 1xRTT network 120, eHRPD network 130, and IMS network 140. UE 110, 1xRTT network 120, eHRPD network 130, and IMS network 140 may include the features described above in connection with, for example, FIGS. 1-20. In one exemplary implementation, FIG. 21 may depict an emergency callback mode (ECM) after an E911 call is completed over eHRPD network 130 and IMS network 140 (block 2105).

As further shown in FIG. 21, the E911 call (e.g., by UE 110) over eHRPD network 130 and IMS network 140 may be complete (block 2110), and UE 110 may start (or restart) an ECM timer (block 2115). UE 110 may remain in the ECM and eHRPD network 130 prior to expiration of the ECM timer (block 2120), and incoming events (e.g., calls) over eHRPD/IMS networks 130/140 (e.g., to UE 110) may not affect the ECM (block 2125). In one exemplary implementation, UE 110 may exit the ECM when the ECM timer expires (blocks 2130 and 2135) and may return to a normal operating mode (block 2140). In another exemplary implementation, UE 110 may exit the ECM due to a user-triggered action, such as receipt of a non-E911 call (blocks 2145 and 2150). UE 110 may stop the ECM timer (block 2155), may exit the ECM, and may return to a normal operating mode (block 2160). UE 110 may then complete the user-triggered action (block 2165).

Figure 22:
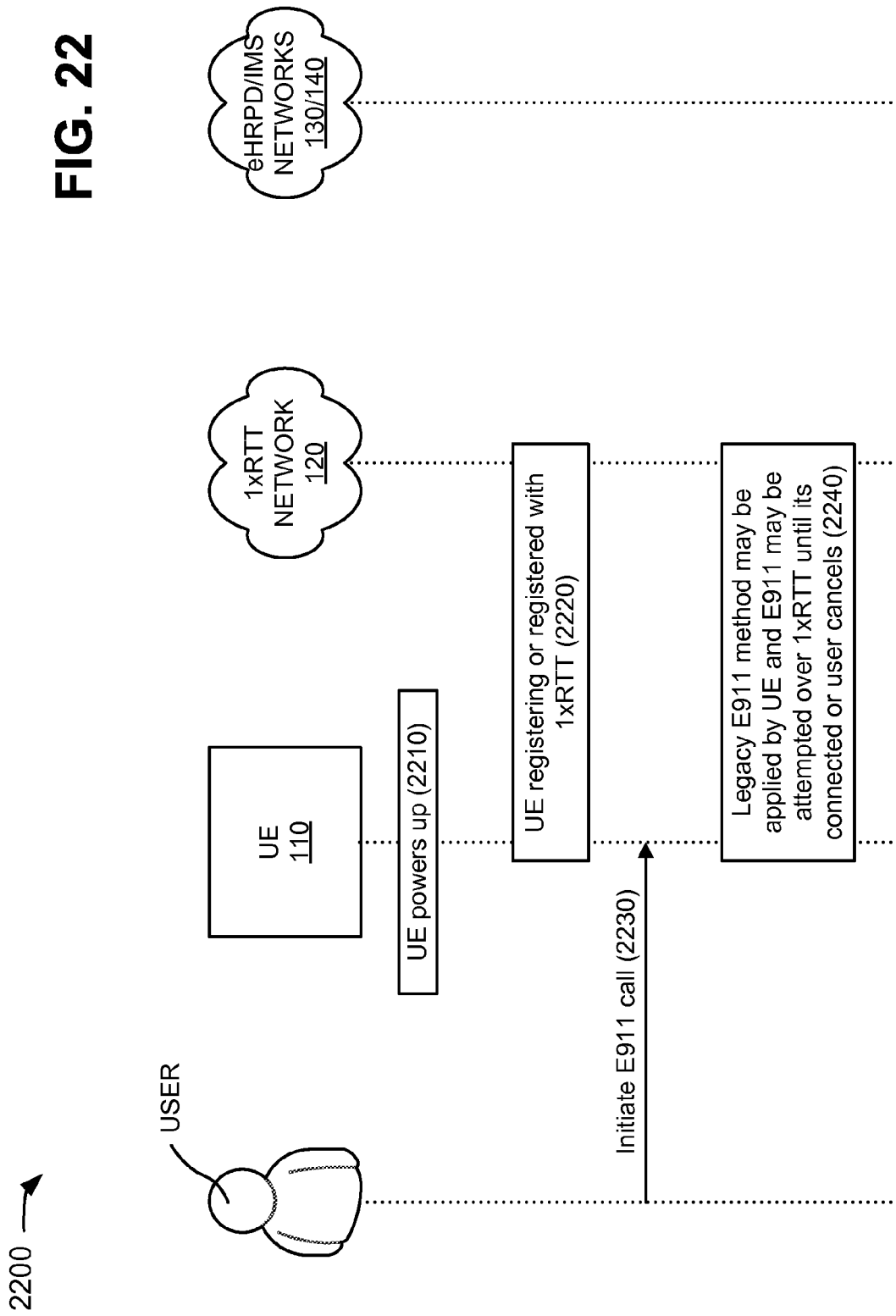

As shown in FIG. 22, an exemplary network portion 2200 may include a user, UE 110, 1xRTT network 120, eHRPD network 130, and IMS network 140. UE 110, 1xRTT network 120, eHRPD network 130, and IMS network 140 may include the features described above in connection with, for example, FIGS. 1-21. In one exemplary implementation, FIG. 22 may depict origination of an E911 call just after UE 110 powers up.

As further shown in FIG. 22, UE 110 may power up (block 2210) and may register (or be registered) with 1xRTT network 120 (block 2220). The user may initiate the E911 call via UE 110 (block 2230). A legacy E911 method may be applied by UE 110 and/or the E911 call may be attempted (e.g., by UE 110) over 1xRTT network 120 until the E911 call is connected or the user cancels (block 2240).

Although FIGS. 11-22 show exemplary devices of network portions 1100-2200, in other implementations, network portions 1100-2200 may contain fewer, different, differently arranged, or additional devices than depicted in FIGS. 1100-2200. In still other implementations, one or more devices of network portions 1100-2200 may perform one or more other tasks described as being performed by one or more other devices of network portions 1100-2200.

An E911 1xRTT timer, an E911 IMS cancel timer, and an ECM timer were described above in connection with one or more of FIGS. 11-22. The E911 1xRTT timer may used by UE 110 to timeout for unsuccessful E911 call completion over 1xRTT network 120 and to switch back to eHRPD/IMS networks 130/140 to place the E911 call. UE 110 may attempt the E911 call over 1xRTT network 120 for this timer duration, and, if the E911 call does not complete within that duration, the E911 call may be canceled over 1xRTT network 120 and attempted over eHRPD/IMS networks 130/140. The E911 1xRTT timer may start when UE 110 is connected to eHRPD network 130, with a valid IMS registration, and a user initiates an E911 call. The E911 1xRTT timer may be stopped when the E911 call over 1xRTT network 120 is successfully connected.

The E911 IMS cancel timer may be used by UE 110 to directly attempt the E911 call over eHRPD/IMS networks 130/140 when a previous E911 call (e.g., which was connecting over IMS network 140) was cancelled by the user. For the duration of this timer the E911 calls initiated by the user may be directly placed over eHRPD/IMS networks 130/140 without switching to 1xRTT network 120. The E911 IMS cancel timer may start when UE 110 has switched back to eHRPD/IMS networks 130/140 to place the E911 call, the E911 call is connecting over IMS network 140, and the user cancels the E911 call while it is connecting over IMS network 140. When the E911 IMS cancel timer expires, UE 110 may return to a normal operating mode and may attempt to place the E911 call via 1xRTT network 120. When the user initiates a E911 call the E911 IMS cancel timer may be stopped and the E911 call may be placed directly over eHRPD/IMS networks 130/140.

The ECM timer may be used by UE 110 to remain on a system where the E911 call was completed. This may permit UE 110 to receive PSAP call-backs and to initiate a new E911 call on the same system (e.g., 1xRTT network 120 or eHRPD network 130) that was used for the previous successful E911 call. The ECM timer may start when a successfully connected E911 call (e.g., either over 1xRTT network 120 or eHRPD network 130) ends and may last for a particular time (e.g., five minutes). When the ECM timer expires, UE 110 may return to a normal operating mode. The ECM timer may be stopped and UE 110 may return to the normal operating mode when the user initiates a normal voice call, a SMS, or a data call.

Figure 23:
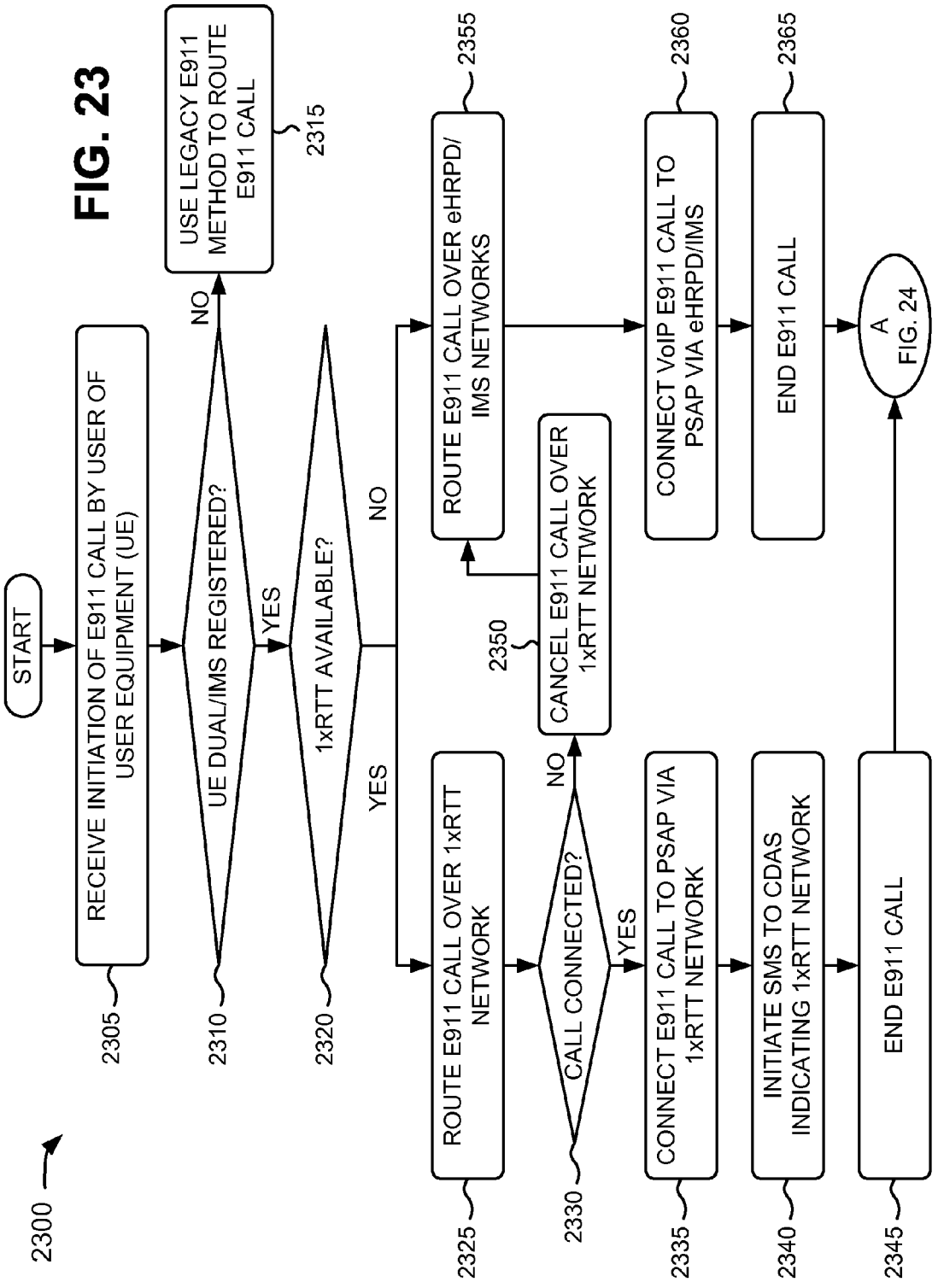
FIG. 23 illustrates a flow chart of an exemplary process for routing an emergency call over a 1xRTT network or an eHRPD/IMS network according to implementations described herein.

FIG. 23 illustrates a flow chart of an exemplary process 2300 for routing an emergency call over a 1xRTT network or an eHRPD/IMS network according to implementations described herein. In one implementation, process 2300 may be performed by UE 110. In another implementation, some or all of process 2300 may be performed by another device or group of devices, including or excluding UE 110.

As shown in FIG. 23, process 2300 may include receiving initiation of an emergency (E911) call by a user of user equipment (UE) (block 2305), and determining if the UE is dual registered or IMS registered (block 2310). If the UE is not dual registered and not IMS registered (block 2310—NO), a legacy E911 method may be used to route the E911 call (block 2315). For example, in implementations described above in connection with FIG. 9, mode register 900 of UE 110 may determine whether UE 110 is registered in 1xRTT network 120 and eHRPD network 130 (e.g., dual registered 930 in a hybrid mode) or is registered in IMS network 140 (e.g., IMS registered 935). If UE 110 is dual registered 930 or is IMS registered 935, the E911 systems and/or methods described herein may be applied by UE 110. If UE 110 is not dual registered 930 or IMS registered 935, UE 110 may apply a "legacy" E911 method. Mode register 900 may provide registration information 940 (e.g., whether UE 110 is dual registered 930 or IMS registered 935) to 1xRTT availability determiner 905 of UE 110. 1xRTT availability determiner 905 may receive registration information 940 from mode register 900, and may receive initiation of an E911 call, as indicated by reference number 945.

As further shown in FIG. 23, availability of a 1xRTT network may be determined (block 2320). If the 1xRTT network is available (block 2320—YES), the E911 call may be routed over the 1xRTT network (block 2325) and may be determined if the E911 is connected to the 1xRTT network (block 2330). For example, in implementations described above in connection with FIG. 9, if registration information 940 indicates that UE 110 is dual registered 930 or IMS registered 935, 1xRTT availability determiner 905 of UE 110 may determine whether 1xRTT network 120 is available to handle the E911 call. If 1xRTT network 120 is determined to be available, 1xRTT availability determiner 905 may provide an indication 950 (e.g., that 1xRTT network 120 is available) to 1xRTT E911 caller 910. 1xRTT E911 caller 910 of UE 110 may receive indication 950 that 1xRTT network 120 is available, and may attempt the E911 call over 1xRTT network 120 (e.g., a home 1xRTT network associated with UE 110), as indicated by reference number 960. If the home 1xRTT network is not available, 1xRTT E911 caller 910 may attempt to place the E911 call in a roaming partner's 1xRTT network or in a 1xRTT network that is not affiliated with UE 110 (e.g., where UE 110 does not have a roaming agreement to the unaffiliated 1xRTT network).

Figure 24:
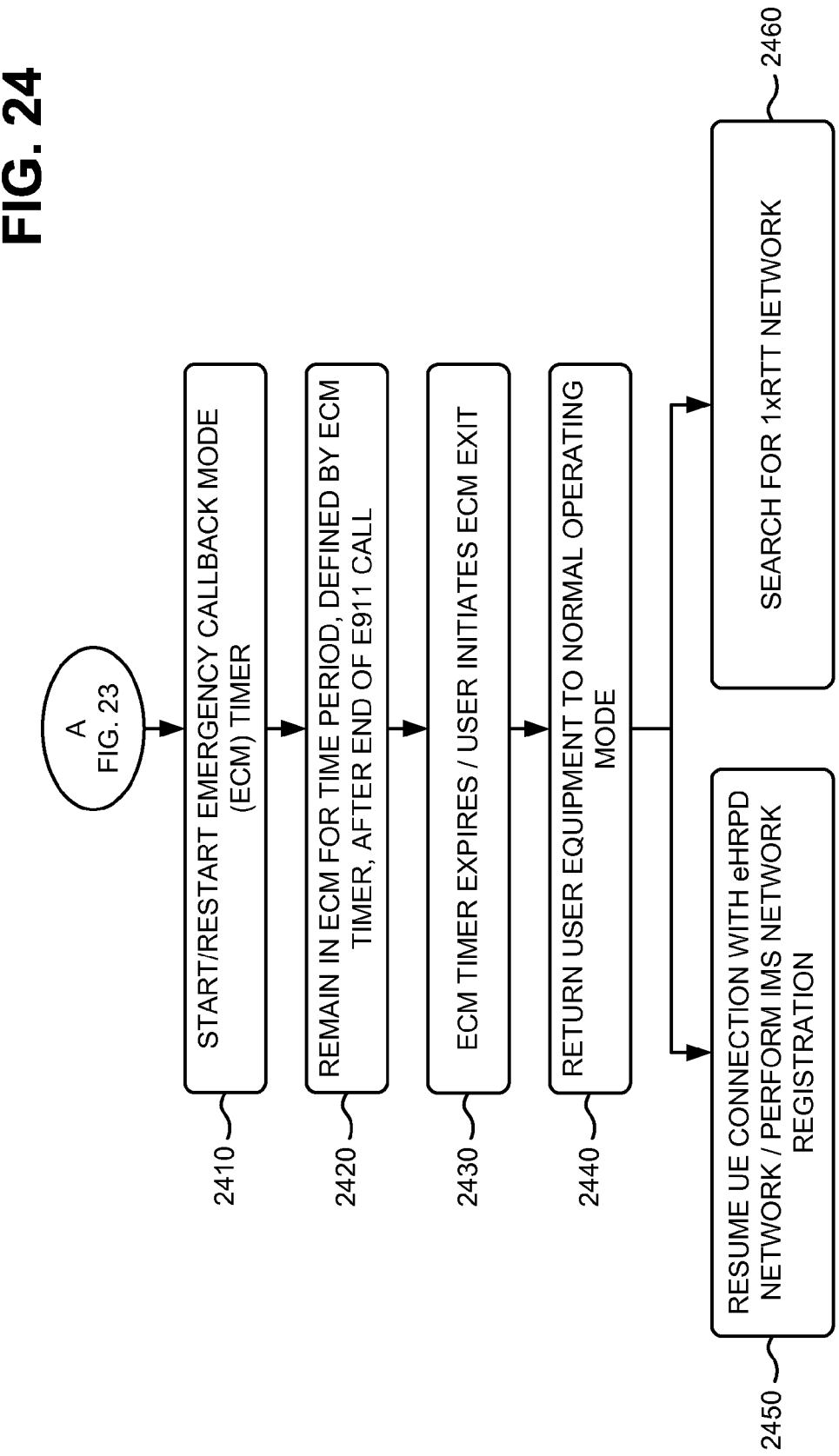
FIG. 24 illustrates a flow chart of an exemplary process for entering an emergency callback mode according to implementation described herein.

Returning to FIG. 23, if the E911 call is connected over the 1xRTT network (block 2330—YES), the E911 call may be connected to a PSAP via the 1xRTT network (block 2335), a SMS, indicating the 1xRTT network, may be initiated to a CDAS (block 2340), the E911 call may end (block 2345), and process 2300 may continue to "A" of FIG. 24. For example, in implementations described above in connection with FIG. 9, when the E911 call is connected over 1xRTT network 120 (e.g., a traffic channel is established to PSAP 610), if UE 110 was registered to IMS network 140 then UE 110 may send a domain notification SMS message over 1xRTT network 120 indicating that UE 110 is attached to 1xRTT network 120 to receive UE 110 terminated activities. After sending the domain notification SMS message, UE 110 may clear the IMS registration state locally, so that IMS re-registration may not be triggered while the E911 call is occurring over 1xRTT network 120. After the E911 call is complete (e.g., ended or dropped) over 1xRTT network 120, status determiner 920 of UE 110 may provide indication 980 (e.g., that the E911 call is complete) to ECM component 925, and UE 110 may enter the ECM.

As further shown in FIG. 23, if the E911 call is not connected over the 1xRTT network (block 2330—NO), the E911 call may be canceled over the 1xRTT network (block 2350). If the E911 call is canceled over the 1xRTT network (block 2350) or if the 1xRTT network is not available (block 2320—NO), the E911 call may be routed over an eHRPD network and an IMS network (block 2355), the E911 call (e.g., a VoIP call) may be connected to a PSAP via the eHRPD/IMS networks (block 2360), the E911 call may end (block 2365), and process 2300 may continue to "A" of FIG. 24. For example, in implementations described above in connection with FIG. 9, status determiner 920 of UE 110 may receive status 975 of the E911 call over 1xRTT network 120 (e.g., whether the E911 call is connected over 1xRTT network 120, whether the E911 call is complete, etc.). If the E911 call fails to connect over 1xRTT network 120, status determiner 920 may provide indication 985 (e.g., that the E911 call is not connected to 1xRTT network 120) to eHRPD E911 caller 915. eHRPD E911 caller 915 may receive indication 955 or 985 that 1xRTT network 120 is not available, may attempt the E911 call over eHRPD network 130 (e.g., when UE 110 is IMS registered 935), as indicated by reference number 965, and the E911 call may be connected to PSAP 610. After the E911 call is complete (e.g., ended or dropped) over eHRPD network 130, eHRPD 911 caller 915 may provide indication 970 (e.g., that the E911 call is complete) to ECM component 925, and UE 110 may enter the ECM without sending a domain notification SMS message.

FIG. 24 illustrates a flow chart of an exemplary process 2400 for entering an emergency callback mode according to implementation described herein. In one implementation, process 2400 may be performed by UE 110. In another implementation, some or all of process 2400 may be performed by another device or group of devices, including or excluding UE 110. Exemplary process 2400 may begin after completion of the E911 call, as set forth in process blocks 2345 and 2365 of FIG. 23.

As shown in FIG. 24, process 2400 may include starting or restarting an emergency callback mode (ECM) timer (block 2410), remaining in the ECM for a timer period, defined by the ECM timer, after an end of the E911 call (block 2420), and expiring of the ECM timer or a user initiating an ECM exit (block 2430). For example, in implementations described above in connection with FIG. 10, ECM timer 1000 of UE 110 may receive indication 970 or 980 (e.g., indicating that the E911 call is complete), and may start an ECM timer (e.g., a timer that may last a particular time period, such as five minutes), as indicated by reference number 1030. ECM timer 1000 may maintain UE 110 in emergency callback mode (ECM) 1040 until the ECM timer expires or until a user instigates an ECM exit (e.g., via UE 110). When the ECM timer expires, ECM timer 1000 may provide indication 1050 (e.g., that the ECM timer expired) to normal mode determiner 1010.

As further shown in FIG. 24, the user equipment may return to a normal operating mode (block 2440), and either the user equipment may resume connection with the eHRPD network and may perform an IMS network registration (block 2450) or the user equipment may search for the 1xRTT network (block 2460). For example, in implementations described above in connection with FIG. 10, normal mode determiner 1010 of UE 110 may receive indication 1050 (e.g., that the ECM timer expired) from ECM timer 1000, and may instruct UE 110 to return to a normal operating mode (e.g., a non-emergency callback mode), as indicated by reference number 1060. eHRPD/IMS/1xRTT register 1020 of UE 110 may receive instructions 1060 (e.g., to return to a normal operating mode) from normal mode determiner 1010. In response to instructions 1060, eHRPD/IMS/1xRTT register 1020 may resume connection with eHRPD network 130 and may perform a registration with IMS network 140, as indicated by reference number 1070. Alternatively and/or additionally, in response to instructions 1060, eHRPD/IMS/1xRTT register 1020 may search for 1xRTT network 120, as indicated by reference number 1080.

Implementations described herein may provide systems and/or methods that may support emergency services in IMS over eHRPD and 1xRTT networks. The systems and/or methods described herein may rely on falling back to a 1xRTT network as a primary mode of supporting an emergency call, but may be enhanced to support an emergency call over an eHRPD network when the 1xRTT network is not available (e.g., or does not have as much coverage as the eHRPD network). With this enhancement, an emergency caller may not be stranded if the 1xRTT network is not available and the eHRPD network is available. Thus, the systems and/or methods described herein may offer an advantage to users of dual-mode UEs (e.g., UEs connectable to 1xRTT and eHRPD networks) compared to users of single-mode UEs (e.g., UEs connectable to only a 1xRTT network). The enhancement provided by the systems and/or methods may be easily and inexpensively implemented. Furthermore, the systems and/or methods described herein may enable a UE to route an emergency call to a correct PSAP, to provide a callback number and a phase 1 location (e.g., a cell/sector address serving the caller), and to efficiently coordinate use of the 1xRTT and eHRPD networks for carrying the emergency call while minimizing post-dial delay.

The foregoing description of implementations provides illustration and description, but is not intended to be exhaustive or to limit the invention to the precise form disclosed. Modifications and variations are possible in light of the above teachings or may be acquired from practice of the invention.

For example, while series of blocks have been described with regard to FIGS. 23 and 24, the order of the blocks may be modified in other implementations. Further, non-dependent blocks may be performed in parallel.

It will be apparent that embodiments, as described herein, may be implemented in many different forms of software, firmware, and hardware in the implementations illustrated in the figures. The actual software code or specialized control hardware used to implement embodiments described herein is not limiting of the invention. Thus, the operation and behavior of the embodiments were described without reference to the specific software code—it being understood that software and control hardware may be designed to implement the embodiments based on the description herein.

Even though particular combinations of features are recited in the claims and/or disclosed in the specification, these combinations are not intended to limit the disclosure of the invention. In fact, many of these features may be combined in ways not specifically recited in the claims and/or disclosed in the specification.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:

receiving, by a mobile communication device, initiation of an emergency call by a user of the mobile communication device;

determining, by the mobile communication device, whether a first type of network is available for the emergency call;

routing, by the mobile communication device, the emergency call over the first type of network when the first type of network is available for the emergency call;

determining, by the mobile communication device, whether the emergency call is connected over the first type of network when the first type of network is available for the emergency call;

connecting, by the mobile communication device, the emergency call to a particular point, via the first type of network, when the emergency call is connected over the first type of network;

providing, by the mobile communication device and when the emergency call is connected over the first type of network, a domain notification short message service (SMS) message, to a particular server of an Internet protocol multimedia subsystem (IMS) network and over the first type of network, indicating that the mobile communication device is connected over the first type of network; and routing, by the mobile communication device, the emergency call over a second type of network when the first type of network is unavailable for the emergency call.

2. The method of claim 1, where the mobile communication device is dual registered in the first type of network and the second type of network.

3. The method of claim 1, where routing the emergency call over the second type of network comprises:

routing the emergency call over the second type of network and the IMS network.

4. The method of claim 1, further comprising:

determining whether the mobile communication device is registered in the second type of network;

determining whether the mobile communication device is registered in the IMS network; and using a legacy emergency call routing method to route the emergency call when the mobile communication device is not registered in the second type of network and the IMS network.

5. The method of claim 1, where, when the emergency call is connected over the first type of network, the method further comprises:

ending the emergency call over the first type of network;

starting an emergency callback mode timer after the emergency call ends; and remaining in an emergency callback mode for a time period, defined by the emergency callback mode timer, after an end of the emergency call over the first type of network.

6. The method of claim 5, further comprising:

returning to a non-emergency operating mode when the emergency callback mode timer expires or when the user initiates an exit from the emergency callback mode; and connecting with the second type of network and performing a registration with the IMS network based on returning to the non-emergency operating mode.

7. The method of claim 1, where, when the first type of network is unavailable for the emergency call, the method further comprises:
connecting the emergency call to the particular point via the second type of network and the IMS network.

8. The method of claim 7, further comprising:
ending the emergency call over the second type of network;
starting an emergency callback mode timer after the emergency call ends; and
remaining in an emergency callback mode for a time period, defined by the emergency callback mode timer, after the ending of the emergency call over the second type of network.

9. The method of claim 8, further comprising:
returning to a non-emergency operating mode when the emergency callback mode timer expires or when the user initiates an exit from the emergency callback mode; and
searching for the first type of network based on returning to the non-emergency operating mode.

10. The method of claim 1, where the mobile communication device comprises one or more of:
a radiotelephone,
a personal communications system (PCS) terminal,
a wireless telephone,
a cellular telephone,
a smart phone,
a personal digital assistant (PDA), or
a laptop computer.

11. The method of claim 1, where the first type of network is a single-carrier radio transmission technology (1xRTT) network.

12. The method of claim 11, where the second type of network is an evolved high rate packet data (eHRPD) network.

13. The method of claim 1, where the particular point is a public safety answering point (PSAP).

14. A mobile communication device, comprising:
a memory; and
one or more processors to:
receive initiation of an emergency call by a user of the mobile communication device,
the mobile communication device being dual registered in a first type of network and a second type of network,
determine whether the first type of network is available for the emergency call,
route the emergency call over the first type of network when the first type of network is available for the emergency call,
determine whether the emergency call is connected over the first type of network when the first type of network is available for the emergency call,
connect the emergency call to a particular point, via the first type of network, when the emergency call is connected over the first type of network, and
provide, when the emergency call is connected over the first type of network, a domain notification short message service (SMS) message, to a call delivery application server of an Internet protocol multimedia subsystem (IMS) network and over the first type of network, indicating that the mobile communication device is connected to the first type of network.

15. The mobile communication device of claim 14, where, when the first type of network is unavailable for the emergency call, the one or more processors are further to:
route the emergency call over the second type of network and the IMS network.

16. The mobile communication device of claim 14, where the one or more processors are further to:
complete the emergency call over the first type of network,
start an emergency callback mode timer after completion of the emergency call, and
remain in an emergency callback mode for a time period, defined by the emergency callback mode timer, after an end of the emergency call over the first type of network.

17. The mobile communication device of claim 16, where the one or more processors are further to:
return to a non-emergency operating mode when the emergency callback mode timer expires or when the user initiates an exit from the emergency callback mode.

18. The mobile communication device of claim 14, where, when the first type of network is unavailable for the emergency call, the one or more processors are further to:
connect the emergency call to the particular point via the second type of network and the IMS network.

19. The mobile communication device of claim 18, where the one or more processors are further to:
complete the emergency call over the second type of network,
start an emergency callback mode timer after completion of the emergency call, and
remain in an emergency callback mode for a time period, defined by the emergency callback mode timer, after completion of the emergency call over the second type of network.

20. The mobile communication device of claim 19, where the one or more processors are further to:
return to a non-emergency operating mode when the emergency callback mode timer expires or when the user initiates an exit from the emergency callback mode.

21. The mobile communication device of claim 14, where the first type of network includes one or more of:
a base station,
a radio network controller,
a mobile switching center (MSC),
a home location register (HLR), and
a positioning determination entity (PDE).

22. The mobile communication device of claim 14, where the second type of network includes one or more of:
a base station,
a high rate packet data serving gateway (HSGW),
a packet data network gateway (PDN-GW),
a policy and charging rule function (PCRF), and
a home subscriber server front end (HSS-FE).

23. A non-transitory computer-readable storage medium containing instructions, the instructions comprising:
one or more instructions, executable by at least one processor of a mobile communication device, to receive initiation of an emergency call by a user of the mobile communication device,
the mobile communication device being dual registered in a first type of network and a second type of network;
one or more instructions, executable by the at least one processor, to determine that the first type of network is available for the emergency call;
one or more instructions, executable by the at least one processor, to route the emergency call over the first type of network after determining that the first type of network is available for the emergency call;

one or more instructions, executable by the at least one processor, to determine that the emergency call is connected over the first type of network;

one or more instructions, executable by the at least one processor, to connect the emergency call to a particular point, via the first type of network, after determining that the emergency call is connected over the first type of network; and one or more instructions, executable by the at least one processor, to provide a domain notification short message service (SMS) message, to a particular server of an Internet protocol multimedia subsystem (IMS) network and over the first type of network, indicating that the mobile communication device is connected over the first type of network.

24. The mobile communication device of claim 14, where the first type of network is a circuit switched code division multiple access (CDMA) network, and where the second type of network is a packet switched CDMA network.

25. The non-transitory computer-readable storage medium of claim 23, where the first type of network is a single-carrier radio transmission technology (1xRTT) network, and where the second type of network is an evolved high rate packet data (eHRPD) network.

* * * * *